United States Patent
Walker

(10) Patent No.: US 7,315,979 B1
(45) Date of Patent: Jan. 1, 2008

(54) METHOD AND SYSTEM FOR DYNAMIC FLOWING DATA TO AN ARBITRARY PATH DEFINED BY A PAGE DESCRIPTION LANGUAGE

(75) Inventor: James R. Walker, Maineville, OH (US)

(73) Assignee: Tesseron Ltd., Maineville, OH (US)

( * ) Notice: Subject to any disclaimer, the term of this patent is extended or adjusted under 35 U.S.C. 154(b) by 0 days.

(21) Appl. No.: 09/436,749

(22) Filed: Nov. 9, 1999

Related U.S. Application Data

(60) Provisional application No. 60/107,583, filed on Nov. 9, 1998.

(51) Int. Cl.
 *G06F 17/00* (2006.01)
 *G06F 15/00* (2006.01)

(52) U.S. Cl. .................. 715/513; 715/521; 358/1.1; 358/1.15

(58) Field of Classification Search ................. 715/513, 715/531, 521; 358/1.11, 1.15, 1.17, 1.18; 345/619, 537, 554, 620, 641; 382/199
See application file for complete search history.

(56) References Cited

U.S. PATENT DOCUMENTS

| | | |
|---|---|---|
| 3,576,367 A | 4/1971 | Sable |
| 3,744,899 A | 7/1973 | Sable |
| 4,085,445 A | 4/1978 | Blevins et al. |
| 4,203,154 A | 5/1980 | Lampson et al. |
| 4,250,976 A | 2/1981 | Mochida |
| 4,268,164 A | 5/1981 | Yajima et al. |
| 4,300,206 A | 11/1981 | Belleson et al. |
| 4,314,357 A | 2/1982 | Kimura et al. |
| 4,322,157 A | 3/1982 | Miura et al. |
| 4,417,322 A | 11/1983 | Berry et al. |
| 4,441,829 A | 4/1984 | Hebert, Jr. et al. |
| 4,445,795 A | 5/1984 | Levine et al. |
| 4,454,576 A | 6/1984 | McInroy et al. |
| 4,460,975 A | 7/1984 | Torkelsen et al. |
| 4,470,129 A | 9/1984 | Disbrow et al. |
| 4,493,049 A | 1/1985 | Donohue et al. |
| 4,509,826 A | 4/1985 | Araghi |
| 4,539,653 A | 9/1985 | Bartlett et al. |
| 4,553,860 A | 11/1985 | Imaizumi et al. |
| 4,651,278 A | 3/1987 | Herzog et al. |

(Continued)

FOREIGN PATENT DOCUMENTS

CA 2210405 7/1996

(Continued)

OTHER PUBLICATIONS

Written Opinion for corresponding International Application No. PCT/US99/26440 mailed Feb. 2, 2001.

(Continued)

*Primary Examiner*—Stephen Hong
*Assistant Examiner*—Adam L. Basehoar
(74) *Attorney, Agent, or Firm*—MacMillan, Sobanski & Todd, LLC

(57) ABSTRACT

Improvements to a method for flowing variable data, such as text data, image data, bar code data, and the like, into a path of a template defined by a PDL specification in a high-speed printing operation.

13 Claims, 18 Drawing Sheets

U.S. PATENT DOCUMENTS

| | | |
|---|---|---|
| 4,677,551 A | 6/1987 | Suganuma |
| 4,718,784 A | 1/1988 | Drisko |
| 4,723,209 A | 2/1988 | Hernandez et al. |
| 4,723,210 A | 2/1988 | Barker et al. |
| 4,723,211 A | 2/1988 | Barker et al. |
| 4,739,477 A | 4/1988 | Barker et al. |
| 4,745,415 A | 5/1988 | Konda et al. |
| 4,745,560 A | 5/1988 | Decker et al. |
| 4,770,972 A | 9/1988 | Nelson et al. |
| 4,771,340 A | 9/1988 | Notermans |
| 4,809,220 A | 2/1989 | Carlson et al. |
| 4,825,251 A | 4/1989 | Nelson et al. |
| 4,826,333 A | 5/1989 | Tanaka |
| 4,839,814 A | 6/1989 | Steidel |
| 4,857,955 A | 8/1989 | Crandall |
| 4,862,386 A | 8/1989 | Axelrod et al. |
| 4,864,516 A | 9/1989 | Gaither et al. |
| 4,870,611 A | 9/1989 | Martin et al. |
| 4,903,067 A | 2/1990 | Murayama et al. |
| 4,903,229 A | 2/1990 | Schmidt et al. |
| 4,912,491 A | 3/1990 | Hoshino et al. |
| 4,933,880 A | 6/1990 | Borgendale et al. |
| 4,937,664 A | 6/1990 | Chiku |
| 4,939,674 A | 7/1990 | Price et al. |
| 4,944,614 A | 7/1990 | Tanaka |
| 4,953,105 A | 8/1990 | Hirata et al. |
| 4,959,769 A | 9/1990 | Cooper et al. |
| 4,963,459 A | 10/1990 | Beery et al. |
| 4,963,899 A | 10/1990 | Resch, III |
| 4,965,597 A | 10/1990 | Ohigashi et al. |
| 4,965,748 A | 10/1990 | Chang et al. |
| 4,969,093 A | 11/1990 | Barker et al. |
| 4,992,956 A | 2/1991 | Kaku et al. |
| 4,994,968 A | 2/1991 | Kato et al. |
| 4,996,662 A | 2/1991 | Cooper et al. |
| 5,001,653 A | 3/1991 | Buchanan et al. |
| 5,021,975 A | 6/1991 | Yamanashi |
| 5,025,396 A | 6/1991 | Parks et al. |
| 5,029,327 A | 7/1991 | Nureki |
| 5,033,009 A | 7/1991 | Dubnoff |
| 5,043,749 A | 8/1991 | Punater et al. |
| 5,050,101 A | 9/1991 | Kiuchi et al. |
| 5,060,980 A | 10/1991 | Johnson et al. |
| 5,067,024 A | 11/1991 | Anzai |
| 5,077,795 A | 12/1991 | Rourke et al. |
| 5,078,748 A | 1/1992 | Akram et al. |
| 5,084,831 A | 1/1992 | Morikawa et al. |
| 5,103,490 A | 4/1992 | McMillin ............... 382/62 |
| 5,104,245 A | 4/1992 | Oguri et al. |
| 5,107,423 A | 4/1992 | Sasaki et al. |
| 5,134,669 A | 7/1992 | Keogh et al. ............ 382/61 |
| 5,136,316 A | 8/1992 | Punater et al. |
| 5,139,003 A | 8/1992 | Ohhashi et al. |
| 5,142,667 A | 8/1992 | Dimperio et al. |
| 5,143,362 A | 9/1992 | Doane et al. |
| 5,148,366 A | 9/1992 | Buchanan et al. |
| 5,150,455 A | 9/1992 | Morikawa et al. |
| 5,157,765 A | 10/1992 | Birk et al. ............. 395/163 |
| 5,157,767 A | 10/1992 | Nihei |
| 5,157,773 A | 10/1992 | Matsumoto et al. |
| 5,173,853 A | 12/1992 | Kelly et al. |
| 5,181,162 A | 1/1993 | Smith et al. |
| 5,191,429 A | 3/1993 | Rourke |
| 5,202,206 A | 4/1993 | Tam .................... 430/41 |
| 5,204,916 A | 4/1993 | Hamilton, Jr. et al. |
| 5,204,946 A | 4/1993 | Shimamura |
| 5,206,951 A | 4/1993 | Khoyi et al. |
| 5,208,906 A | 5/1993 | Morgan ............... 395/148 |
| 5,218,539 A | 6/1993 | Elphick et al. |
| 5,222,211 A | 6/1993 | Mueller et al. |
| 5,222,235 A | 6/1993 | Hintz et al. |
| 5,222,236 A | 6/1993 | Potash et al. ............ 395/600 |
| 5,226,161 A | 7/1993 | Khoyi et al. |
| 5,231,698 A | 7/1993 | Forcier ................ 395/146 |
| 5,235,654 A | 8/1993 | Anderson et al. |
| 5,237,655 A | 8/1993 | Statt et al. |
| 5,239,625 A | 8/1993 | Bogart et al. |
| 5,241,464 A | 8/1993 | Greulich et al. |
| 5,243,518 A | 9/1993 | Holt et al. |
| 5,257,097 A | 10/1993 | Pineau et al. |
| 5,261,047 A | 11/1993 | Rivshin |
| 5,267,155 A | 11/1993 | Buchanan et al. |
| 5,276,799 A | 1/1994 | Rivshin |
| 5,280,574 A | 1/1994 | Mizuta et al. |
| 5,282,269 A | 1/1994 | Willems et al. |
| 5,287,128 A | 2/1994 | Doane et al. |
| 5,287,444 A | 2/1994 | Enescu et al. |
| 5,290,109 A | 3/1994 | Midorikawa |
| 5,291,243 A | 3/1994 | Heckman et al. ........ 355/201 |
| 5,297,217 A | 3/1994 | Hamilton, Jr. et al. |
| 5,303,341 A | 4/1994 | Rivshin |
| 5,303,379 A | 4/1994 | Khoyi et al. |
| 5,307,266 A | 4/1994 | Hayashi et al. |
| 5,307,458 A | 4/1994 | Freiburg et al. |
| 5,309,558 A | 5/1994 | Rourke et al. |
| 5,315,693 A | 5/1994 | Hirosawa et al. |
| 5,317,646 A | 5/1994 | Sang, Jr. et al. |
| 5,319,748 A | 6/1994 | Motoyama ............. 395/162 |
| 5,323,217 A | 6/1994 | Christy et al. |
| 5,323,312 A | 6/1994 | Saito et al. |
| 5,325,484 A | 6/1994 | Motoyama |
| 5,327,341 A | 7/1994 | Whalen et al. |
| 5,328,092 A | 7/1994 | File |
| 5,329,616 A | 7/1994 | Silverbrook |
| 5,339,240 A | 8/1994 | Beaverson |
| 5,349,647 A | 9/1994 | Freiburg et al. |
| 5,353,388 A | 10/1994 | Motoyama |
| 5,355,493 A | 10/1994 | Silberbauer et al. |
| 5,360,277 A | 11/1994 | Matsubara et al. |
| 5,367,673 A | 11/1994 | Goldsmith et al. |
| 5,368,334 A | 11/1994 | Christy et al. |
| 5,375,204 A | 12/1994 | Motoyama et al. |
| 5,379,368 A | 1/1995 | Imai et al. |
| 5,379,373 A | 1/1995 | Hayashi et al. |
| 5,384,886 A | 1/1995 | Rourke |
| 5,384,901 A | 1/1995 | Glassner et al. |
| 5,404,294 A | 4/1995 | Karnik |
| 5,412,566 A | 5/1995 | Sawa |
| 5,416,849 A | 5/1995 | Huang |
| 5,416,896 A | 5/1995 | Motoyama |
| 5,420,696 A | 5/1995 | Wegeng et al. |
| 5,420,974 A | 5/1995 | Morris et al. |
| 5,421,015 A | 5/1995 | Khoyi et al. |
| 5,422,992 A | 6/1995 | Motoyama et al. |
| 5,425,140 A | 6/1995 | Bloomfield et al. |
| 5,436,627 A | 7/1995 | Motoyama et al. |
| 5,437,038 A | 7/1995 | Silberbauer et al. |
| 5,438,650 A | 8/1995 | Motoyama et al. |
| 5,440,745 A | 8/1995 | Platte et al. |
| 5,446,837 A | 8/1995 | Motoyama et al. |
| 5,446,842 A | 8/1995 | Schaeffer et al. |
| 5,448,685 A | 9/1995 | Ogura et al. |
| 5,448,691 A | 9/1995 | Motoyama |
| 5,450,537 A | 9/1995 | Hirai et al. |
| 5,450,541 A | 9/1995 | Rourke et al. |
| 5,451,111 A | 9/1995 | Matsuhisa |
| 5,452,094 A | 9/1995 | Ebner et al. |
| 5,455,599 A | 10/1995 | Cabral et al. |
| 5,455,945 A | 10/1995 | VanderDrift |
| 5,458,284 A | 10/1995 | Haan et al. |
| 5,459,819 A | 10/1995 | Watkins et al. ........... 395/117 |
| 5,459,826 A | 10/1995 | Archibald ............... 395/147 |
| 5,465,165 A | 11/1995 | Tanio et al. ............. 358/448 |
| 5,467,448 A | 11/1995 | Hilton et al. ............ 395/148 |

| | | |
|---|---|---|
| 5,483,623 A | 1/1996 | Nagashima |
| 5,483,624 A | 1/1996 | Christopher et al. |
| 5,483,629 A | 1/1996 | Motoyama et al. |
| 5,487,165 A | 1/1996 | Tsay et al. |
| 5,490,243 A | 2/1996 | Millman et al. |
| 5,493,634 A | 2/1996 | Bonk et al. |
| 5,495,565 A | 2/1996 | Millard et al. |
| 5,499,329 A | 3/1996 | Motoyama et al. |
| 5,500,928 A | 3/1996 | Cook et al. ............... 395/133 |
| 5,502,796 A | 3/1996 | Takahashi |
| 5,504,843 A | 3/1996 | Takahashi |
| 5,504,891 A | 4/1996 | Motoyama et al. |
| 5,506,697 A | 4/1996 | Li et al. ................. 358/448 |
| 5,506,985 A | 4/1996 | Motoyama et al. |
| 5,521,710 A | 5/1996 | Strossman et al. |
| 5,532,100 A | 7/1996 | Christy et al. |
| 5,535,318 A | 7/1996 | Motoyama et al. |
| 5,539,529 A | 7/1996 | Merchant ................. 358/400 |
| 5,542,052 A | 7/1996 | Deutsch et al. ........... 395/131 |
| 5,544,287 A | 8/1996 | Roth |
| 5,546,577 A | 8/1996 | Marlin et al. |
| 5,548,687 A | 8/1996 | Motoyama |
| 5,559,933 A | 9/1996 | Boswell |
| 5,563,987 A | 10/1996 | Scott et al. |
| 5,563,998 A | 10/1996 | Yaksich et al. |
| 5,563,999 A | 10/1996 | Yaksich et al. |
| 5,587,800 A | 12/1996 | Miyazaki |
| 5,592,683 A | 1/1997 | Chen et al. |
| 5,594,860 A | 1/1997 | Gauthier ................. 395/501 |
| 5,600,768 A | 2/1997 | Andresen ................ 395/135 |
| 5,611,024 A | 3/1997 | Campbell et al. .......... 395/114 |
| 5,611,035 A | 3/1997 | Hall |
| 5,615,316 A | 3/1997 | Imai et al. |
| 5,621,020 A | 4/1997 | Khatib et al. |
| 5,634,091 A | 5/1997 | Sands et al. |
| 5,640,559 A | 6/1997 | Silberbauer et al. |
| 5,640,577 A | 6/1997 | Scharmer |
| 5,642,435 A | 6/1997 | Loris |
| 5,668,897 A | 9/1997 | Stolfo |
| 5,671,345 A | 9/1997 | Lhotak ..................... 395/133 |
| 5,675,788 A | 10/1997 | Husick et al. |
| 5,680,615 A | 10/1997 | Marlin et al. |
| 5,689,625 A | 11/1997 | Austin et al. |
| 5,706,365 A | 1/1998 | Rangarajan et al. |
| 5,717,840 A * | 2/1998 | Pardo ...................... 358/1.13 |
| 5,727,220 A | 3/1998 | Hohensee et al. |
| 5,729,665 A * | 3/1998 | Gauthier ................. 358/1.18 |
| 5,729,674 A | 3/1998 | Rosewarne et al. |
| 5,734,915 A | 3/1998 | Roewer |
| 5,740,338 A | 4/1998 | Gauthier et al. |
| 5,745,910 A * | 4/1998 | Piersol et al. .............. 715/515 |
| 5,754,750 A | 5/1998 | Butterfield et al. .......... 395/118 |
| 5,758,074 A | 5/1998 | Marlin et al. |
| 5,760,914 A | 6/1998 | Gauthier et al. |
| 5,765,006 A | 6/1998 | Motoyama |
| 5,765,874 A | 6/1998 | Chanenson et al. |
| 5,768,488 A | 6/1998 | Stone et al. |
| 5,778,377 A | 7/1998 | Marlin et al. |
| 5,781,711 A | 7/1998 | Austin et al. |
| 5,793,946 A | 8/1998 | Gauthier et al. |
| 5,796,411 A | 8/1998 | Cyman et al. ............. 345/502 |
| 5,796,930 A | 8/1998 | Gauthier et al. ........... 395/116 |
| 5,801,716 A | 9/1998 | Silverbrook |
| 5,832,530 A | 11/1998 | Paknad et al. ............. 707/500 |
| 5,833,375 A | 11/1998 | Gauthier et al. |
| 5,841,420 A | 11/1998 | Kaply et al. |
| 5,852,673 A | 12/1998 | Young |
| 5,866,286 A | 2/1999 | Christy et al. |
| 5,877,865 A * | 3/1999 | Fukuta ..................... 358/296 |
| 5,880,742 A | 3/1999 | Rao et al. |
| 5,895,455 A | 4/1999 | Bellinger et al. |
| 5,896,462 A | 4/1999 | Stern |
| 5,900,003 A | 5/1999 | Ben Dror |
| 5,915,258 A | 6/1999 | Toyokura |
| 5,920,685 A | 7/1999 | Romano et al. |
| 5,926,185 A | 7/1999 | Vyncke et al. ............ 345/433 |
| 5,937,153 A | 8/1999 | Gauthier |
| 5,946,461 A | 8/1999 | Landry et al. |
| 5,949,438 A | 9/1999 | Cyman et al. ............ 345/502 |
| 5,953,007 A | 9/1999 | Center et al. |
| 5,960,164 A | 9/1999 | Dorfman et al. |
| 5,963,968 A | 10/1999 | Warmus et al. ............ 707/517 |
| 5,982,994 A | 11/1999 | Mori et al. |
| 5,983,243 A | 11/1999 | Heiney et al. |
| 5,987,461 A | 11/1999 | Dreyer et al. ................ 707/7 |
| 6,006,242 A | 12/1999 | Poole et al. |
| 6,006,281 A | 12/1999 | Edmunds |
| 6,009,442 A | 12/1999 | Chen et al. |
| 6,016,380 A | 1/2000 | Norton |
| 6,018,774 A * | 1/2000 | Mayle et al. ............... 709/250 |
| 6,020,894 A | 2/2000 | Silverbrook |
| 6,027,195 A | 2/2000 | Gauthier et al. |
| 6,049,390 A * | 4/2000 | Notredame et al. ........ 358/1.15 |
| 6,064,397 A * | 5/2000 | Herregods et al. .......... 345/630 |
| 6,078,403 A | 6/2000 | Palmer |
| 6,078,406 A | 6/2000 | Nickerson |
| 6,145,946 A | 11/2000 | Gauthier et al. |
| 6,146,027 A | 11/2000 | Orton et al. |
| 6,209,010 B1 | 3/2001 | Gauthier et al. |
| 6,236,463 B1 | 5/2001 | Cyman et al. |
| 6,243,172 B1 | 6/2001 | Gauthier et al. |
| 6,290,406 B1 | 9/2001 | Gauthier et al. |
| 6,292,267 B1 | 9/2001 | Mori et al. |
| 6,310,695 B1 | 10/2001 | Gauthier et al. |
| 6,326,983 B1 | 12/2001 | Venable et al. |
| 6,327,599 B1 | 12/2001 | Warmus et al. |
| 6,330,073 B1 | 12/2001 | Sciatto |
| 6,332,149 B1 * | 12/2001 | Warmus et al. ............. 715/517 |
| 6,381,028 B1 | 4/2002 | Gauthier |
| 6,437,875 B1 | 8/2002 | Unno |
| 6,446,100 B1 | 9/2002 | Warmus et al. |
| 6,459,498 B2 | 10/2002 | Miyake et al. |
| 6,465,165 B2 | 10/2002 | Landry-Coltrain et al. |
| 6,487,568 B1 | 11/2002 | Gauthier et al. |
| 6,493,106 B1 | 12/2002 | Gauthier et al. |
| 6,505,980 B1 | 1/2003 | Allday |
| 6,557,017 B1 | 4/2003 | Venable |
| 6,597,467 B2 | 7/2003 | Miyake et al. |
| 6,599,325 B2 | 7/2003 | Gauthier et al. |
| 6,684,188 B1 | 1/2004 | Mitchell et al. |
| 6,687,016 B2 | 2/2004 | Gauthier |
| 6,707,572 B1 | 3/2004 | Walker et al. |
| 6,771,387 B2 | 8/2004 | Gauthier |
| 2002/0089681 A1 | 7/2002 | Gauthier |
| 2002/0122205 A1 | 9/2002 | Gauthier |
| 2002/0149792 A1 | 10/2002 | Gauthier et al. |
| 2003/0050934 A1 | 3/2003 | Gauthier et al. |
| 2004/0130752 A1 | 7/2004 | Gauthier |
| 2004/0141197 A1 | 7/2004 | Gauthier |
| 2005/0076001 A1 | 4/2005 | Gauthier et al. ................ 707/1 |
| 2005/0185212 A1 | 8/2005 | Gauthier |
| 2005/0286065 A1 | 12/2005 | Gauthier et al. |

FOREIGN PATENT DOCUMENTS

| | | |
|---|---|---|
| CA | 2207840 | 12/1997 |
| CA | 2215094 | 4/1998 |
| DE | 4313958 A1 | 11/1993 |
| DE | 43113959 A1 | 11/1993 |
| DE | 4316282 A1 | 11/1994 |
| DE | 4313958 C2 | 8/1998 |
| EP | 0075732 A2 | 4/1983 |
| EP | 0131966 A2 | 1/1985 |
| EP | 0075732 B1 | 8/1987 |
| EP | 2220511 A | 1/1990 |
| EP | 01311966 B1 | 3/1990 |

| | | |
|---|---|---|
| EP | 0394168 A2 | 10/1990 |
| EP | 0475601 A2 | 3/1992 |
| EP | 0475601 B1 | 4/1992 |
| EP | 0478335 A2 | 4/1992 |
| EP | 0527097 A2 | 2/1993 |
| EP | 0538059 A2 | 4/1993 |
| EP | 0539135 A2 | 4/1993 |
| EP | 0539135 A3 | 7/1993 |
| EP | 0594370 A1 | 4/1994 |
| EP | 0527097 A3 | 3/1995 |
| EP | 0614156 A1 | 3/1996 |
| EP | 0703524 A1 | 3/1996 |
| EP | 0394168 B1 | 6/1997 |
| EP | 0703524 B1 | 7/1997 |
| EP | 0 703 524 B1 | 8/1997 |
| EP | 0539135 B1 | 12/1997 |
| EP | 0837401 A2 | 4/1998 |
| EP | 0837401 A2 | 4/1998 |
| EP | 0538059 B1 | 4/1999 |
| EP | 0594370 B1 | 1/2000 |
| EP | 1011981 A1 | 6/2000 |
| EP | 1132809 A2 | 9/2001 |
| EP | 0837401 B1 | 2/2003 |
| EP | 1132809 B1 | 1/2004 |
| JP | 56157369 A | 12/1981 |
| JP | 58108045 A | 6/1983 |
| JP | 58224755 A | 12/1983 |
| JP | 59068244 A | 4/1984 |
| JP | 59068277 A | 4/1984 |
| JP | 60073869 | 4/1985 |
| JP | 60145865 A | 8/1985 |
| JP | 61018802 A | 1/1986 |
| JP | 1130067 A | 6/1986 |
| JP | 61118775 A | 6/1986 |
| JP | 1179463 A | 8/1986 |
| JP | 1223935 A | 10/1986 |
| JP | 61254369 A | 11/1986 |
| JP | 62065126 A | 3/1987 |
| JP | 62207664 A | 9/1987 |
| JP | 62261467 A | 11/1987 |
| JP | 63039085 A | 2/1988 |
| JP | 63108428 A | 5/1988 |
| JP | 63271275 A | 11/1988 |
| JP | 63300259 A | 12/1988 |
| JP | 63300260 A | 12/1988 |
| JP | 63300263 A | 12/1988 |
| JP | 1133051 A | 5/1989 |
| JP | 1141746 A | 6/1989 |
| JP | 1142674 A | 6/1989 |
| JP | 1142675 A | 6/1989 |
| JP | 1142680 A | 6/1989 |
| JP | 2112017 A | 4/1990 |
| JP | 3091064 A | 4/1991 |
| JP | 3121870 A | 5/1991 |
| JP | 4059372 A | 2/1992 |
| JP | 5016450 A | 1/1993 |
| JP | 5031997 A | 2/1993 |
| JP | 5057967 A | 3/1993 |
| JP | 5119937 A | 5/1993 |
| JP | 5246104 A | 9/1993 |
| JP | 5270093 A | 10/1993 |
| JP | 5298037 A | 11/1993 |
| JP | 5338313 A | 12/1993 |
| JP | 6032015 A | 2/1994 |
| JP | 6035632 A | 2/1994 |
| JP | 6099635 A | 4/1994 |
| JP | 6106810 A | 4/1994 |
| JP | 125454 A | 5/1994 |
| JP | 6171176 A | 6/1994 |
| JP | 6171177 A | 6/1994 |
| JP | 6238982 A | 8/1994 |
| JP | 6340129 A | 12/1994 |
| JP | 7064981 A | 3/1995 |
| JP | 43113959 C2 | 8/1998 |
| JP | 3048582 B2 | 3/2000 |
| WO | WO9502224 A1 | 1/1995 |
| WO | WO9622573 A1 | 7/1996 |
| WO | WO9718514 A1 | 5/1997 |
| WO | WO9808176 A1 | 2/1998 |
| WO | WO9821044 A1 | 5/1998 |
| WO | WO0028435 A2 | 5/2000 |
| WO | WO0028435 A3 | 10/2000 |

OTHER PUBLICATIONS

PCT International Search Report for corresponding International Application No. PCT/US99/26440 mailed Jul. 5, 2000.
PCT International Search Report for International Application No. PCT/US99/26440. May 7, 2000.
Adobe Developer Support. Emulation of the Execform Operator. Technical Note #5113. Mar. 31, 1992.
Adobe Developer Support. Using EPS Files in PostScript Language Forms. Technical Note #5144. Oct. 4, 1996.
Adobe Systems Inc. PostScript Language Program Design. Feb. 1988.
Adobe Systems Inc. PostScript Language Reference Manual. 2nd edition. 1990. pp. 16, 17, 55, 56, 146, 147, 157, 158, 172 & 173.
GMC Digital Systems AG. Print Bar DLL PBAR0004 Code 39 Technical Guidelines. Apr. 7, 1993.
GMC Digital Systems AG. Print Bar DLL PBAR0006 Code 128 Technical Guidelines. Apr. 7, 1993.
GMC Digital Systems AG. Print Layout - A Short Overview vol. 1. Dec. 1990.
GMC Digital Systems AG. PrintManager V 2.1 fur PrintRobot Installation. Jun. 15, 1994.
GMC Digital Systems AG. PrintManager V 2.11 for Print Robot Operating Manual. Sep. 1, 1994.
GMC Digital Systems AG. PrintNet Brochures.
GMC Didgital Systems AG. PrintNet PrintBar Operating Manual. Feb. 26, 1993.
GMC Digital Systems AG. PrintNet PrintBar V1.01 User Manual. Aug. 23, 1994.
GMC Digital Systems AG. PrintNEt PrintFont for Windows Operating Manual. Mar. 29, 1993.
GMC Digital Systems AG. PrintNet PrintFont V2.1 User Manual. Oct. 26, 1994.
GMC Digital Systems AG. PrintNet PrintImage User Manual. Oct. 26, 1994.
GMC Digital Systems AG. PrintNet PrintLayout Operating Manual. Feb. 26, 1993.
GMC Digital Systems AG. PrintNet PrintLayout II Bedienungsanleitung. Mar. 31, 1993.
GMC Digital Systems AG. PrintNet PrintLayout II Operating Manual. Jul. 4, 1994.
GMC Digital Systems AG. PrintNet PrintLayout V2.1 Operating Manual. Oct. 26, 1994.
GMC Digital Systems AG. PrintNet PrintJob V2.02 User manual. Oct. 26, 1993.
GMC Digital Systems AG. PrintNet PrintJob V2.04 User Manual. Sep. 5, 1994.
GMC Digital Systems AG. PrintNet PrintNumbers V.1.1 Operating Manual. Jul. 4, 1994.
GMC Digital Systems AG. PrintNet PrintNumbers Operating Manual. Oct. 26, 1994.
GMC Digital Systems AG. PrintRobot Printmanager V2.00 ≈ Bedienungsanleitung. Feb. 17, 1993.
GMC Digital Systems AG. PrintRobot Printmanager Installation. Feb. 17, 1993.
GMC Digital Systems AG. PrintRobot: A European Premiere.
GMC Digital Systems AG. PrintManager V 2.1 für PrintRobot Bedienungsanleitung. Mar. 15, 1994.
GMC Digital Systems AG. Print Bar DLL PBAR0002 Code 2/5 Interleaved Technical Guidelines. Mar. 12, 1993.
IDG InfoWorld, mar. 20, 1995, Product Reviews; Desktop publishing software; p. 92.
IDG InfoWorld, Oct. 9, 1995, Review, p. 91.

IDG InfoWorld, May 9, 1994, Review; p. 98.
Interquest, Ltd. FreeFlow Variable Information Workflow (white paper). 2004.
Labels & Labels. *New Generation of Digital Label Press Technology Available*. May/Jun. 1986.
McGilton, Henry and Compione, amry. PostScript By Example. 1992. pp. 463-470.
McGraw-Hill, Inc., Business Week: *Information Processing: Data Processing*. Industrial Edition Jun. 9, 1980.
McGraw-Hill, Inc., Business Week: *Product Design*. Industrial Edition. Jun. 20, 1977.
McGraw-Hill, Inc., IBM Dictionary of Computing; George McDaniel. 10th edition. 1993. p. 63.
Microsoft Press. Computer Dictionary. 3rd edition. 1997. pp. 53, 72, & 356.
Oxford University Press, Dictionary of Computing: Defination of "Page Description Language". 4th edition. 1996. p. 352.
Press Information Drupa '86. *GMC PrintRobot, the revolutionary new printing technology*. 1986.
Adobe Systems Inc. PostScript Language Reference Manual. 3rd edition. 2002.
Adobe Systems Inc. PostScript language Tutorial and Cookbook. 1985.
Holzgang, David A. Understanding PostScript Programming. 3rd ed. 1992. pp. 268-269.
IBM Corp. *Attribute Specification in a Structured Data Stream*. IBM Technical Disclosure Bulletin [online]. Jan. 18, 1995 [retrieved Nov. 20, 2006]. Retrieved from the Internet:<URL: http://www.IP.com>.
IBM Corp. *Document Enviroment Hierarchy*. IBM Technical Disclosure Bulletin. Sep. 1, 1988.
IBM Corp. *Dynamic Repositioning of Object Areas on a Page*. IBM Technical Disclosure Bulletin, vol. 32, No. IOB. Mar. 1990.
IBM Corp. *Enhanced Technique for Merging Data From a Second Document*. IBM Technical Disclosure Bulletin, vol. 30, No. 5. Oct. 1987.
IBM Corp. *Enhanced Data Merge Source For Shell Document*. IBM Technical Disclosure Bulletin, vol. 32, No. 12. May 1990.
IBM Corp. *Form Overlay Print System Using Postscript*. IBM Technical Disclosure Bulletin [online], vol. 39 No. 2. [retrieved Nov. 20, 2006]. Retrieved from the Internet:<URL: http://www.IP.com>.
IBM Corp. "Identifying and Optimizing PostScript Variable Data". IBM Technical Disclosure Bulletin [online], vol. 40 No. 9. [retrieved Nov. 20, 2006]. Retrieved from the Internet:<URL: http://www.IP.com>.
IBM Corp. "Improved Technique for Printing Multi-Copy Documents". IBM Technical Disclosure Bulletin, vol. 29, No. 1. Jun. 1986.
IBM Corp. "Method for Automatically Printing Variable Content Labels On-Line". IBM Technical Disclosure Bulletin, vol. 33, No. 8. Jan. 1991.
IBM Corp. "Method for Combining Variable and Fixed Print Data in a Print Image". IBM Technical Disclosure Bulletin [online], vol. 36, No. 10. Oct. 1993 [retrieved Nov. 20, 2006]. Retrieved from the Internet:<URL: http://www.IP.com>.
IBM Corp. "Method for Joining Documents for Printing in a Personal Computer System". IBM Technical Disclosure Bulletin, vol. 29 No. 7. Dec. 1986.
IBM Corp. "Method to Merge Table data Using One-Cell Table Objects". IBM Technical Disclosure Bulletin, Document No. 86A 61235/85-130 P200/AT8840660. May 1986.
IBM Corp. "Registered Name Identification and Variable Names". IBM technical Disclosure Bulletin, vol. 32, No. 9B. Feb 1990.
IBM Corp. "Using PostScript Resources in Advanced Function Printing". IBM Technical Disclosure Bulletin, vol. 38, No. 1. Jan. 1995 [retrieved Nov. 20, 2006]. retrieved from the Internet:<URL: http://www.IP.com>.
IBM Corp. "Variable Paged Array Datatype". IBM Technical Disclosure Bulletin, vol. 37, No. 7. Jul. 1994 [retrieved Nov. 20, 2006]. Retrieved from the Internet:<URL: http://www.IP.com>.
IBM Corp. "Word Processor Having Conditional Text Printing for Mass Mailings". IBM Technical Disclosure Bulletin, vol. 29, No. 6.
Nov. 1986 [retrieved Nov. 20, 2006]. Retrieved from the Internet:[URL: http://www.IP.com].
Reid, Glenn C. Thinking in PostScript. 1990.
Sherman, John F. Taking Advantage of PostScript (1992).
Adobe Systems Inc. Postscript Language Reference Manual Supplement for Version 2014. Mar. 10, 1994.
Adobe Systems Inc. PostScript Language Reference Manual. 1st edition. 1985.
Haxton, K. Xerox The Document Company: Variable Information Printing, *From 1977 to today, Leading in Information Age Printing*. 2005.
Reid, Glenn C., Adobe Systems Inc. PostScript Language Program Design. 1998.
Xerox Corp. Technical Tutorial. Sep. 19, 2005.
Notice of Prior Litigation Allegations. Jan. 2007.
Adobe Systems Inc. PostScript Language Reference Manual. 2nd edition. 1990. PP. 708-765.
Adobe Systems Inc. PostScript Language Reference Manual. 3rd edition. 2002. PP. 1-293.
Adobe Systems Inc. PostScript Language: Tutorial and Cookbook. 2000.
Adobe Systems Inc. Programming the Display PostScript System with NeXTstep. 1991. PP. 372-380.
Adobe Systems Inc. Programming the Display PostScript System with X. 1993.
Bhushan, Abbhay & Plass, Michael, The Interpress page and document description language, Computer Magazine Jun. 1986.
Braswell, Frank Merritt. Inside PostScript. 1989 pp. 14-10 - Apendex III-23.
Holzgang, David A. Display PostScript Programming. 1990 PP. 225-323.
Holzgang, David A. Understanding PostScript. 3nd edition. 1992.
Pfifther, Pamela. Inside the Publishing Revolution - The Adobe Story. 2003.
Roth, Stephen F. Real world PostScript: Techniques from PostScript Proffesionals. 1988. PP. 228-384.
Thomas, Barry. A PostScript Cookbook. 1988.
Vollenwcider, Peter. Encapsulated PostScript: Application Guide for the Macintosh and PC's. 1990.
Seybold Interactive Report - Variable Data Products.
Smith, Ross. Learning PostScript: A Visual Approach. 1990.
Spring, Michael B. And Dubin, David S. Hands-On PosrScript. 1992.
Spring, Michael B. Electronic Printing and Publishing: The Documents Processing Revolution. 1991.
Wikipedia- The Free Encyclopedia. Definition of "DisplayWrite".
Xerox Corp. 9700 Electronic Printing System Forms Creation Guide 910001C Jan. 1979, El Segundo, California.
Xerox Corp. 9700 Electronic Printing System Forms Creation Guide, El Segundo, California Jun. 1977.
McGilton, Henry and Campione, Mary. PostScript By Example. 1992.
Xerox Corp. Introduction to Interpress, Apr. 1994.
Glover, Gary. Running PostScript from MS-DOS. 1st edition. 1989.
Harrington, Steven I. and Buckley, Robert R. Interpress - The Source Book. 1988.
Holzgang, David A. Understanding PostScript Programming. 1st edition. 1987. PP. 1-209, 210-225, 226-241 & 242-262.
Holzang, David A. Understanding PostScript Programming. 2nd edition. 1988.
Introduction to Interscript Sep. 19, 1985.
On the supply side, Editor and Publisher for Jul. 21, 1984.
Richoh Company Ltd. Special Issue on Pattern recognition and Natural Language Processing. Ricoh Technical Report, No. 15. 1986.
New High Speed Vans RIP Features Variable PostScript. The Hard Copy Observer, vol. 7, No. 2. Feb. 1997.
Xerox Corp. 9700 Electronic Printing System Operator's Guide 600P81096-B, El Segundo, California.
Xerox Corp. 9700 Electronic Printing System Rference Manual (Preliminary), El Segundo, California Jun. 1977.
Xerox Corp. 9700 Forms Description Language Self-Study Module, El Segundo, California Jan. 1979.

Xerox Corp. 9700 Laser Printing System Operator Guide, El Segundo, California, Dec. 1987.

Xerox Corp. 9700-8700 Electronic Printing Systems Version 10 Software Advance Notice, Mike Muttera, El Segundo, California Oct. 18, 1984.

Xerox Corp. Interpress Electronic Printing Standard Jan. 1986.

Xerox Corp. Interpress Electronic Printing Standard Version 2.1 Apr. 1984.

Xerox Corp. News from Xerox Corporation, Nineteen Companies Plan to Use Common Printing Standard for Computers.

Xerox Corp. News from Xerox Corporation, Xerox Announces Extensions of Interpress Printing Architecture.

Xerox Corp. New from Xerox Corporation, Xerox Announces Interpress Printing Architecture.

Xerox Corp. News from Xerox Corporation, Xerox offers enhanced 9700 and 8700 electronic printers with improved printing quality.

Xerox Corp. System Intergration Guide, Interpress 82 Electronic Printing Standard Jan. 1982.

Xerox Corp. System Intergration Guide, Interpress 82 Reader's Guide, Jerry Mendelson Apr. 1984.

Xerox Corp. Xerox Generic Format Training Manual - R.XCH. Rel 1.3. Dec. 1993.

Xerox Corp. Xerox Interpress Toolkit Software, Sunnyvale, California 1986.

Adobe Systems Inc. PostScript Language Program Design. 2001.

Wěbopēdia- The #1 online encyclopedia deicated to computer technology. Definition of "Bit Map" (curently available at http://www.webopedia.com/TERM/b/bit_map.html).

Whatis.com-searchSMB.com Definations. Definition of "Bit Map" (currently available at http://searchsmb.techtarget.com/sDefinition/0,290660,sid44_gci211672,00.html).

Xerox Corp. 9700 Electronic Printing System Press Information, El Segundo, California.

Xerox Corp. 9700 Electronic Printing System, El Segundo, California Jan. 1981.

Xerox Corp. 9700 Electronic Printing System, El Segundo, California Jan. 1982.

Xerox Corp. 9700 Electronic Printing System, Horizontal-Vertical Printing Characters, El Segundo, California.

Xerox Corp. 9700 Electronic Printing System, The Leading Edge in Information Management, El Segundo, California, Feb. 1982.

Xerox Corp. 9700 Electronic Printing System, The Leading Edge in Information Management, El Segundo, California, Jul. 1983.

Xerox Corp. 9700 Electronic Printing System, The Leading Edge in Information Management, El Segundo, California.

Xerox Corp. 9700 Laser Printing System Operator Guide, El Segundo, California, Jan. 1986. PP. I-V.

Xerox Corp. Command Set for ZK.B - Docuprint390 Application. Version 1.0. Dec. 14, 1992.

Xerox Corp. Electronic Printing Systems 8700 9700 Model V, El Segundo, California.

Xerox Corp. Interpress, The Document and Page Description Language for Performance Printing, El Segundo, California, May 1986.

Xerox Corp. The Leading Edge & Internal Memo from R.V. Adams of Jun. 1, 1977 & 9700 Electronic Printing System, El Segundo, California.

Xerox Corp. The Leading Edge & Letter form R.V. Adams & 9700 Electronic Printing System, El Segundo, California.

Xerox Corp. Xerox Generic Format ("XGF") Command Set for DocriPrint (draft). Version 1.2. Jul. 1, 1993.

Xerox Corp. Xerox Generic Format ("XGF") Command Set for DocuPrint (draft). Version 1.2a. Aug. 24, 1993.

Xerox Corp. Xerox Generic Format ("XGF") Command Set for DocuPrint. Version 1.1 a. Jun. 14, 1993.

Xerox Corp. Xerox Generic Format ("XGF") Command Set for DocuPrint. Version 1.3. Jan. 4, 1994.

Xerox Corp. Xerox Generic Format ("XGF") Reference manual. Version 1.3a. Jun. 1994.

Xerox Corp. Xerox Generic Format ("XGF") Reference manual. Version 1.4. Jun. 1995.

Xerox VIPP Technical Reference Manual: FAQs (2002) (currently available at http://www.vippcommands.cornlcontroller.asp?WChFAQs).

Xerox Corp. 9700 Reference Manual, Input Processing Functions pp. 4-8 - 4-37.

Xerox Corp. 9700-8790 Laser Printing Systems Print Description Language Refence Version 3.9 Feb. 1994.

Xerox Corp. Examples of Documents Electronically Created by the Xerox 9700.

* cited by examiner

```
[PageDescriptionLanguageFile] ← 126
    FilePath = /usr/jobs/books/jungle.ps ← 128

[MergeFiles] ← 144
    names
    rikkitxt

[names] ← 146
    FilePath = /usr/jobs/books/names.txt ← 130
    MergeType = delimited
    MergeHeader = yes
    RecordDelimiter = '\n'
    FieldDelimiter = '|'
    PageSelectField = book
    DoGlobalSubstitution = False
    DoGlobalSubstitution = True
    AtEndOfFile = Restart

[rikkitxt] ← 148
    FilePath = /usr/jobs/books/rikki.txt ← 132
    MergeType = field
    MergeHeader = no
    AtEndOfFile = Restart
    SmartQuotes = True
    FieldDelimiter = #
    PageBreakDelimiter = ~
    ParagraphDelimiter = @
    DoGlobalSubstitution = True

[MergeFiles:substitution] ← 150
    Mowgli's = <<name1p>>
    Mowgli = <<name1>>
    Teddy's = <<name1p>>
    Teddy = <<name1>>

[Wrap] ← 136
    path ← 134

[Path] ← 138
    Justify = left
    Overflow = path
    Margins = 0.10 in
    DrawPath = False ← 142
    ParagraphIndent = 0in
    ParagraphAdjust = 0.10in
    MinPageBreakLines = 15
    PageBreakLineAdjust = 1in
    FillRule = EvenOddRule ← 140

[Serializers]
    pagenumber = numeric 5 10 start -3 step riz ValueField startpagenum

[DataField]
    rpic1 = A
```

171 { Rikki-Tikki-Tavi
@ —154
156A — #
@ —154
At the hole where he went in@ —154
Red-Eye called to Wrinkle-Skin.@ —154
Hear what little Red-Eye saith:@ —154
"Nag, come up and dance with death!"@ —154
@ —154
Eye to eye and head to head,@ —154
173 { (Keep the measure, Nag.)@ —154
This shall end when one is dead;@ —154
(At thy pleasure, Nag.)@ —154
Turn for turn and twist for twist--@ —154
(Run and hide thee, Nag.)@ —154
Hah! The hooded Death has missed!@ —154
(Woe betide thee, Nag!)@ —154
@ —154

156B — #
@ —154
This is the story of the great war that Rikki-tikki-tavi fought
single-handed, through the bathrooms of the bungalow in
Segowlee cantonment. Darzee, the Tailorbird, helped him, and
Chuchundra, the musk-rat, who never comes out into the middle of
the floor, but always creeps round by the wall, gave him advice,
but Rikki-tikki did the real fighting.
@ —154
He was a mongoose, rather like a little cat in his fur and his
tail, but quite like a weasel in his head and his habits. His
eyes and the end of his restless nose were pink. He could scratch
himself anywhere he pleased with any leg, front or back, that he
chose to use. He could fluff up his tail till it looked like a
bottle brush, and his war cry as he scuttled through the long
grass was: "Rikk-tikk-tikki-tikki-tchk!"
@ —154
One day, a high summer flood washed him out of the burrow
where he lived with his father and mother, and carried him,
kicking and clucking, down a roadside ditch. He found a little
wisp of grass floating there, and clung to it till he lost his
senses. When he revived, he was lying in the hot sun on the
middle of a garden path, very draggled indeed, and a small boy was
saying, "Here's a dead mongoose. Let's have a funeral."
@ —154
"No," said his mother, "let's take him in and dry him.
Perhaps he isn't really dead."
@ —154
They took him into the house, and a big man picked him up
between his finger and thumb and said he was not dead but half
choked. So they wrapped him in cotton wool and warmed him over a
little fire, and he opened his eyes and sneezed.
@ —154
"Now," said the big man (he was an Englishman who had just
moved into the bungalow), "don't frighten him, and we'll see what
he'll do."

@ —154
It is the hardest thing in the world to frighten a mongoose, because he is eaten up from nose to tail with curiosity. The motto of all the mongoose family is "Run and find out," and Rikki-tikki was a true mongoose. He looked at the cotton wool, decided that it was not good to eat, ran all round the table, sat up and put his fur in order, scratched himself, and jumped on the small boy's shoulder.
@ —154     193
156C — #
"Don't be frightened, Teddy," said his father. "That's his way of making friends."     193
@ —154
"Ouch! He's tickling under my chin," said Teddy.
@ —154
Rikki-tikki looked down between the boy's collar and neck, snuffed at his ear, and climbed down to the floor, where he sat rubbing his nose.     193
@ —154
"Good gracious," said Teddy's mother, "and that's a wild creature! I suppose he's so tame because we've been kind to him."
@ —154                                            193
"All mongooses are like that," said her husband. "If Teddy doesn't pick him up by the tail, or try to put him in a cage, he'll run in and out of the house all day long. Let's give him something to eat."
@ —154
They gave him a little piece of raw meat. Rikki-tikki liked it immensely, and when it was finished he went out into the veranda and sat in the sunshine and fluffed up his fur to make it dry to the roots. Then he felt better.
@ —154
"There are more things to find out about this house," he said to himself, "than all my family could find out in all their lives. I shall certainly stay and find out."
@ —154
He spent all that day roaming over the house. He nearly drowned himself in the bath-tubs,, put his nose into the ink on a writing table, anf burned it on the end of the big man's cigar, for he climbed up in the big man's lap to see how writing was done. At the nightfall he ran into Teddy's nursery to watch how kerosene lamps were lighted, and when Teddy went to bed Rikki-tikki climbed up too. But he was a restless companion, because he had to get up and attend to every noise all through the night, and find out what made it. Teddy's mother and father came in, the last thing, to look at their boy, and Rikki-tikki was awake on the pillow. "I don't like that," said Teddy's mother. "He may bite the child." "He'll do no such thing," said the father. "Teddy's safer with that little beast than if he had a bloodhound to watch him. If a snake came into the nursery now--"
@ —154
156D — #
But Teddy's mother wouldn't think of anything so awful.
@ —154

FIG. 15B

*The Jungle Book* — 162

*Rikki-Tikki-Tavi* — 172

158

*At the hole where he went in*
*Red-Eye called to Wrinkle-Skin.*
*Hear what little Red-Eye saith:*
*"Nag, come up and dance with death!"*

*Eye to eye and head to head,*
*(Keep the measure, Nag.)*
*This shall end when one is dead;*
*(At thy pleasure, Nag.)*
*Turn for turn and twist for twist--*
*(Run and hide thee, Nag.)*
*Hah! The hooded Death has missed!*
*(Woe betide thee, Nag!)*

— 174

This is the story of the great war that Rikki-tikki-tavi fought single-handed, through the bathrooms of the bungalow in Segowlee cantonment. Darzee, the Tailorbird, helped him, and Chuchundra, the musk-rat, who never comes out into the middle of the floor, but always creeps round by the wall, gave him advice, but Rikki-tikki did the real fighting.

*The Jungle Book*

158 ⟶

He was a mongoose, rather like a little cat in his fur and his tail, but quite like a weasel in his head and his habits. His eyes and the end of his restless nose were pink. He could scratch himself anywhere he pleased with any leg, front or back, that he chose to use. He could fluff up his tail till it looked like a bottle brush, and his war cry as he scuttled through the long grass was: "Rikk-tikk-tikki-tikki-tchk!"

One day, a high summer flood washed him out of the burrow where he lived with his father and mother, and carried him, kicking and clucking, down a roadside ditch. He found a little wisp of grass floating there, and clung to it till he lost his senses. When he revived, he was lying in the hot sun on the middle of a garden path, very draggled indeed, and a small boy was saying, "Here's a dead mongoose. Let's have a funeral."

"No," said his mother, "let's take him in and dry him. Perhaps he isn't really dead."

They took him into the house, and a big man picked him up between his finger and thumb and said he was not dead but half choked. So they wrapped him in cotton wool and warmed him over a little fire, and he opened his eyes and sneezed.

"Now," said the big man (he was an Englishman who had just moved into the bungalow), "don't frighten him, and we'll see what he'll do."

*The Jungle Book*

Rikki-Tikki-Tavi

*At the hole where he went in
Red-Eye called to Wrinkle-Skin.
Hear what little Red-Eye saith:
"Nag, come up and dance with death!"*

*Eye to eye and head to head,
(Keep the measure, Nag.)
This shall end when one is dead;
(At thy pleasure, Nag.)
Turn for turn and twist for twist--
(Run and hide thee, Nag.)
Hah! The hooded Death has missed!
(Woe betide thee, Nag!)*

This is the story of the great war that Rikki-tikki-tavi fought single-handed, through the bathrooms of the bungalow in Segowlee cantonment. Darzee, the Tailorbird, helped him, and Chuchundra, the musk-rat, who never comes out into the middle of the floor, but always creeps round by the wall, gave him advice, but Rikki-tikki did the real fighting.

*The Jungle Book*

He was a mongoose, rather like a little cat in his fur and his tail, but quite like a weasel in his head and his habits. His eyes and the end of his restless nose were pink. He could scratch himself anywhere he pleased with any leg, front or back, that he chose to use. He could fluff up his tail till it looked like a bottle brush, and his war cry as he scuttled through the long grass was:
"Rikk-tikk-tikki-tikki-tchk!"

One day, a high summer flood washed him out of the burrow where he lived with his father and mother, and carried him, kicking and clucking, down a roadside ditch. He found a little wisp of grass floating there, and clung to it till he lost his senses. When he revived, he was lying in the hot sun on the middle of a garden path, very draggled indeed, and a small boy was saying, "Here's a dead mongoose. Let's have a funeral."

"No," said his mother, "let's take him in and dry him. Perhaps he isn't really dead."

They took him into the house, and a big man picked him up between his finger and thumb and said he was not dead but half choked. So they wrapped him in cotton wool and warmed him over a little fire, and he opened his eyes and sneezed.

"Now," said the big man (he was an Englishman who had just moved into the bungalow), "don't frighten him, and we'll see what he'll do."

The Jungle Book

It is the hardest thing in the world to frighten a mongoose, because he is eaten up from nose to tail with curiosity. The motto of all the mongoose family is "Run and find out," and Rikki-tikki was a true mongoose. He looked at the cotton wool, decided that it was not good to eat, ran all round the table, sat up and put his fur in order, scratched himself, and jumped on the small boy's shoulder.

"Don't be frightened, Ranen," said his father. "That's his way of making friends."

"Ouch! He's tickling under my chin," said Ranen.

Rikki-tikki looked down between the boy's collar and neck, snuffed at his ear, and climbed down to the floor, where he sat rubbing his nose.

"Good gracious," said Ranen's mother," and that's a wild creature! I suppose he's so tame because we've been kind to him."

"All mongooses are like that," said her husband. "If Ranen doesn't pick him up by the tail, or try to put him in a cage, he'll run in and out of the house all day long. Let's

METHOD AND SYSTEM FOR DYNAMIC FLOWING DATA TO AN ARBITRARY PATH DEFINED BY A PAGE DESCRIPTION LANGUAGE

CROSS-REFERENCE TO RELATED APPLICATIONS

This application claims priority from U.S. Provisional Application No. 60/107,583 filed Nov. 9, 1998.

BACKGROUND

The present invention relates to the high speed printing industry, and more particularly a system and method for flowing variable data into a page description language file in a high speed printing environment.

Application programs, such as word processors, illustrators, and computer-aided design systems are software packages used to create a document (text and graphics) on a computer screen and to simultaneously generate a page description language ("PDL") specification, which is to be transferred to the printer or to any other type of raster or output device for creating a hard copy or copies of the document. Alternatively, a PDL specification can be generated by a programmer without the assistance of an application program.

The printer executes the PDL specification to generate a bitmap of the document, or a raster-data representation of a document, and eventually transfers the bitmap or raster-data to the physical medium. A typical PDL language, such as PostScript (a registered trademark of Adobe Corporation) defines a page of the document as containing a number of data areas, where each data area contains either graphic or alpha-numeric data. Each data area is defined by a "graphic state," which is a collection of parameters for controlling the representation and appearance of text and graphics. For example, the graphic state can include a set of text attributes such as scale-factor, type-font, etc. In PostScript, an example of a PDL command used to build a graphic state can be: twenty rotate \Times-Roman findfont 14 scalefont and setfont. Examples of PDL commands used to define the graphic or alpha-numeric data that is displayed in the data area include: 0 0 moveto and (ABC) show. The entire group of PDL commands used to define a document is hereinafter referred to as the "PDL specification."

In variable data printing each printed document shares a common template and there is at least one area in the template that changes for each printing of the template. Typical PDL languages are not designed for high-speed variable data printing because, with PDL languages and PDL interpreters, even if a single item of data in the document changes, an entirely new PDL specification must be created and interpreted. For example, if one-hundred thousand copies of a mass-mailing advertisement were to printed (i.e., each copy of which is identical except for the mailing address), it is typically necessary to generate a new PDL specification for each copy to printed. Hence, to generate one-hundred thousand advertisements, it would be necessary to generate one-hundred thousand PDL specifications, even though each advertisement is virtually the same except for the variable data area. The processing time required to interpret and render one-hundred thousand PDL specifications is enormous, significantly slowing the entire printing system.

Furthermore, typical PDL languages do not include any text or data flowing capabilities. These features are usually implemented by the application program, and when such an application program flows data (such as text) into a PDL document, the calculations to determine where to place the data are completed prior to the generation to the PDL specification. Accordingly, variable data cannot be flowed into a template document without creating a new PDL specification for each document. Accordingly, there is a need for a high-speed printing operation having the ability to merge variable data into a template defined by a PDL specification; and in particular, having the ability to flow variable data into a template path defined by PDL specification in a high-speed printing operation.

SUMMARY

It is an object of the present invention to provide a system and method for flowing variable data (such as text data, image data, bar code data and the like) into a path of a template defined by a PDL specification in a high-speed printing operation. It is a further object of the present invention to provide the ability to generate a plurality of merged bitmaps, which are each essentially a copy of a template, except for at least one portion of the template that contains an arbitrary path. In that path, each merged bitmap can contain a different set of variable data merged into it. The template is defined by a page description language, and the page description language only needs to be processed or interpreted once before creating all of the merged bitmaps, thus providing an extremely high-speed variable data printing operation.

The computer implemented method for flowing data into an arbitrary path defined by a page description language specification ("PDL specification") generally comprises the steps of: processing (interpreting) the PDL specification to produce a template; designating a path defined in the PDL specification as a wrapping path; associating a block of variable data with the wrapping path; and merging variable data, according to the path boundary and according to a predefined flow rule, into a copy of the template.

The method of the present invention is accomplished by executing a control task in conjunction with a PDL interpreter program. The control task generates a template display list based upon the PDL commands in the PDL specification. The display list includes a plurality of rendering commands, where each rendering command designates a particular data area or object to be rendered, the graphics state to be applied to the data area and the offset address at which the rendered object, if any, in the data area is to be overwritten onto the final bit map. The graphic states for each data area are set forth in the PDL specification, and pertain to the print attributes that describe how particular graphic or alpha-numeric data is to appear on the printed page. These attributes can include the size, font, position, orientation, location, and the like.

The control task, during the PDL interpretation procedure, monitors the data areas defined by the PDL specification to watch for variable data paths defined by the PDL code. If the control task identifies a path as being a variable data path, it reserves the graphic states associated with that variable data path in a cache or memory, and then moves on to the next data area defined in the PDL specification, preferably without allowing the path data to be added to the template display list.

Once the interpreter program completes its interpretation of the PDL specification, the control task saves the template display list in memory without dispatching a bitmap of the template to the printer. Subsequently, a merge task is initiated which accesses a variable data record from a merge file; associates the variable data record to a particular variable data path; creates representations of the variable data, such as rendering commands according to the reserved graphic states pertaining to that particular variable data path, according to the boundary of the particular variable data path and according to a predefined flow rule; and then generates a merged bitmap by processing the template display list and the variable data rendering commands. The final merged bitmap that may then be dispatched to the printer. This merge task is repeated for each variable data record in the merge file associated with that particular variable data path to create a plurality of the merged bitmaps.

Thus, the PDL specification of the template need only be interpreted once, saving significant processing time for the variable printing operation, because the reserved graphic states may be utilized over and over again to create the flowed data bitmap for each variable data record contained in the merge file.

How the control task identifies a particular PDL path defined in the PDL specification as being unique, i.e., as being identified as a wrapping path, is an important step in the above process. This is accomplished by providing a text command in the PDL specification that defines one or more characters that are recognized by the control task as being special characters, as opposed to merely being characters that are to be included on the printed page. The control task monitors all text strings defined by the PDL specification for such special characters, and responsive to a detection of the special character in the text string defined by the text command, the control task identifies the path command that has a predetermined relationship with the text command in the PDL specification. This predetermined relationship can be satisfied by the first path command to follow the text command in the PDL specification or by the path command that is "grouped" with the text command in the PDL specification.

In the preferred embodiment of the present invention, the characters "<<" and ">>" are used as part of a special text string to define an area as a variable data area. And if that special text string also includes the string wrap then the control task will recognize that the very next path command appearing in the PDL specification will be a unique path, in this case a path for flowing variable text bitmaps into.

BRIEF DESCRIPTION OF THE DRAWINGS

FIG. 14 is a second example of a job ticket file for use with the present invention;

FIGS. 15A and 15B are a second example of a merge file for use with the present invention;

FIGS. 17A–17C are graphical representations of process steps of the present invention operating on data contained in the PDL specification of FIG. 16, the job ticket of FIG. 14 and the merge files of FIGS. 15A–15B; and FIGS. 18A–18C are examples of merged pages created by the process of the present invention using the PDL specification of FIG. 16, the job ticket of FIG. 14 and the merge files of FIGS. 15A–15B.

DETAILED DESCRIPTION

Figure 1:
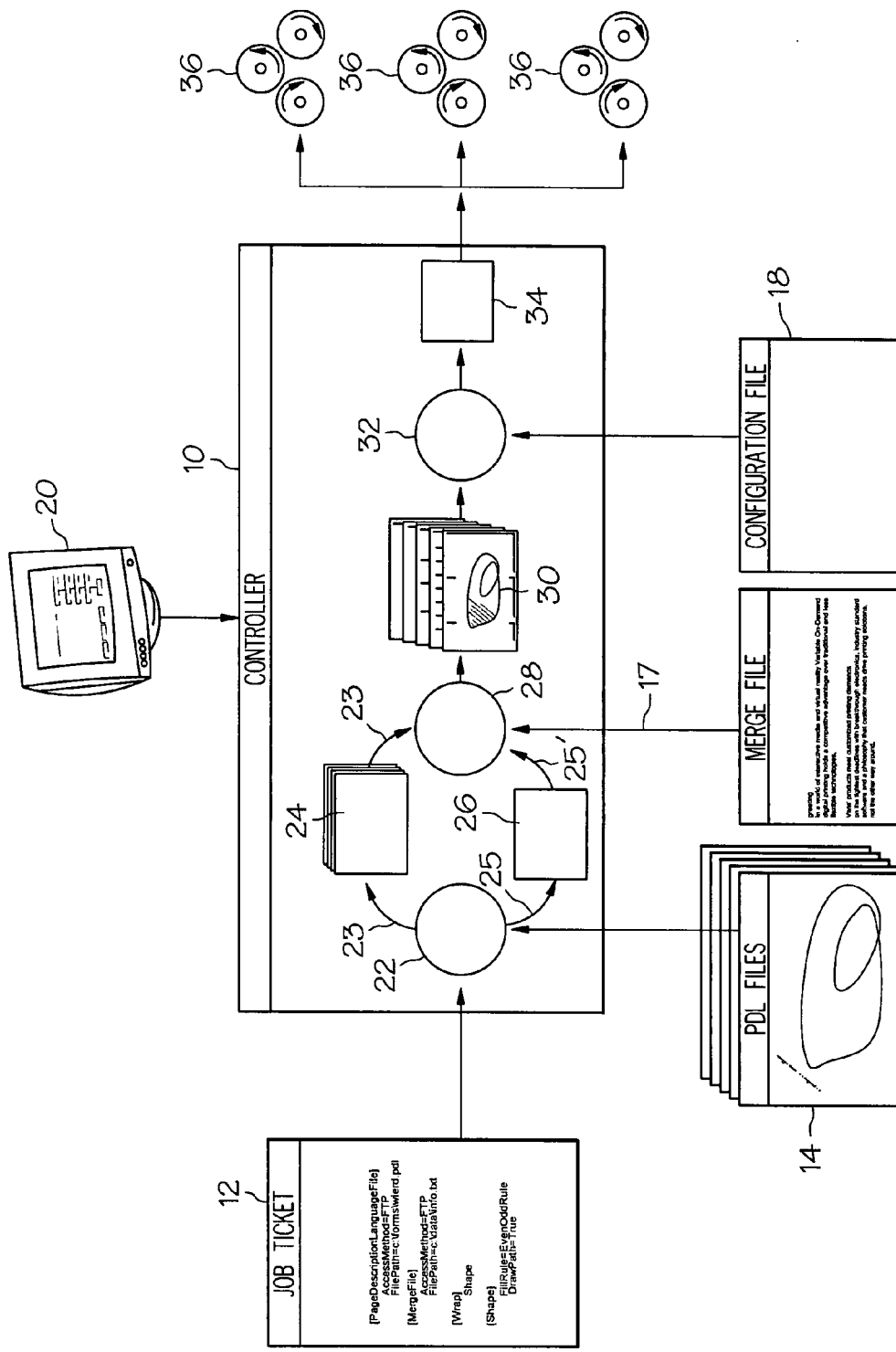
FIG. 1 is a is a schematic, block-diagram representation of a high-speed printing system according to the present invention.

As shown in FIG. 1, a system for performing the method of the present invention includes a printer controller 10 having access to a job ticket file 12, a page description language ("PDL") file 14, a source of variable data such as a merge file 16, and an optional printer configuration file 18. The system also contains an operator control terminal 20 for providing operator controls such as indicating the name and path of the job ticket file 12 for the specific print job.

The job ticket file 12 contains the guidelines for the print job which can include the names and locations of the PDL file(s) 14, the merge file(s) 16, the configuration file(s) 18, etc.; and may also include special instructions pertaining to features such as data wrapping, described below. The PDL file 14 is preferably a PostScript® (registered ™ of Adobe Systems, Inc.) specification created by an application program, such as a word processor, illustrator, or computer-aided design system. The merge file 16 contains platform independent data, such as text data, image data, bar-code data and the like, which is to be merged into a template bitmap defined by the PDL file during the merging task, as will be described in detail below. The configuration file 18 defines the print engines and post processing equipment and other options to be executed.

Initially, the path and name of the job ticket file 12 is specified by the operator using the operator control terminal 20. The printer controller 10 retrieves the job ticket file 12 and then retrieves the PDL files 14 and merge files 16 that are specified in the job ticket file. Next the controller 10 initiates a control task 22 in conjunction with a page description code interpreter program.

The control task interprets the PDL specification from the PDL file 14 and monitors data areas defined in the PDL specification to watch for areas defined by the specification to become variable. If the control task identifies a data area as being a variable data area, it reserves the graphic states 23 of that variable data area in memory 24 and then moves on to the next data area defined by the PDL specification, usually without allowing any data defined by the variable data area to be added to the template bitmap. Preferably, the control task 22 will also create a font cache (an entire set of character bitmaps generated according to the reserved graphic states) for the reserved graphic states, which will be linked to the reserved graphic states in memory 24. Once the control task completes its processing of the PDL specification, the control task saves the template bitmap 25 in memory 26.

The control task 22 may also create a template display list 25 of static data defined by the PDL file 14. The display list 25 will include a plurality of rendering commands, where each rendering command designates a particular static data area or object to be rendered, the graphics state to be applied to the static data area and the offset address at which the rendered object, if any, in the static data area is to be overwritten onto the final bit map. As mentioned above, the graphic states for each data area are set forth in the PDL specification, and pertain to the print attributes that describe how particular graphic or alpha-numeric data is to appear on the printed page. Once the control task completes its processing of the PDL specification, the control task may save the template display list 25 in memory 26. If the PDL file 14 does not include code for any static data, the control task may generate an empty template display list 25 or may decide not to create a template display list at all.

Next, a merge task 28, having access to the variable data records 17 from the merge file 16, is executed to apply the reserved graphics states 23 and associated font cache to the variable data records 17, creating rendering commands for that variable data record as defined by the graphic states. The merge task 28 retrieves a copy 25' of the template display list 25 from the memory 26 and merges the variable data rendering commands with the template display list to create a merged display list 30. Finally, the controller 10 performs a rendering task 32 to render the merged display list 30 into a plurality of bitmap bands 34 for dispatching to at least one print engine 36.

A method for performing the above control task and merge task is described in U.S. Pat. No. 5,729,665 entitled "Method of Utilizing Variable Data Fields with a Page Description Language," the disclosure of which is incorporated herein by reference. A method and system architecture for performing the above merging, banding and dispatching operations are respectively described in U.S. Pat. Nos. 5,594,860 5,796,930, the disclosures of which are also incorporated herein by reference.

Figure 2:
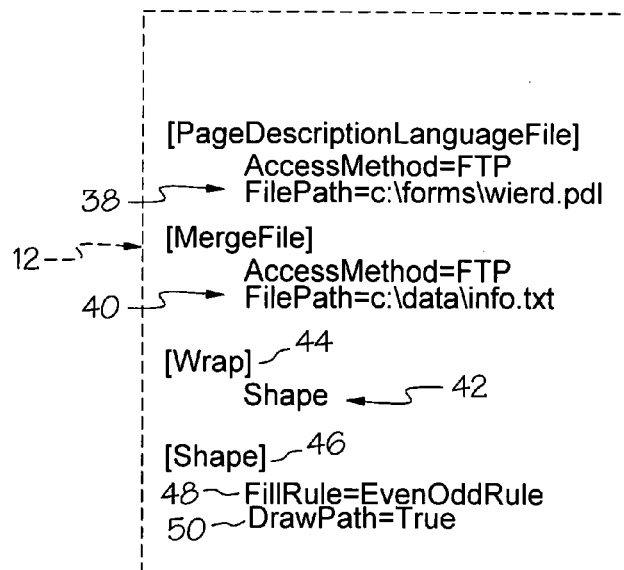
FIG. 2 is a first example of a job ticket file for use with the present invention.

A first embodiment of the present invention is illustrated by way of example in FIGS. 2–10. As illustrated in FIG. 2, the job ticket file 12 can contain a file path 38 for determining the location and name of the PDL file, and can contain a file path 40 for determining the location and name of the merge file. The job ticket file 12 can also contain a descriptive name of a path 42, in this case, named "Shape," for identifying a name of a path in the PDL file that is to have variable data flowed into it during the merge task. The variable data to be flowed into the path, text data in this case, will be taken from the file designated by the file path 40 of the merge file. In this case the merge file is named "info.text." The group header 44 "[Wrap]" indicates that the group is defining a wrapping path. After the wrapping path "Shape" has been defined in the job ticket file, a second group header 46 "[Shape]" can be thereafter defined in the job ticket file to provide information about the wrap path; such as defining the fill rule 48 to be used in the wrapping operation, and such as defining a path drawing rule 50, i.e., whether the path is to be drawn in the final rendered image. Other definable wrapping commands for the particular path "Shape" can include defining the top, bottom or side margins, defining the justification, setting the number of paths to flow the data into, defining an overflow path, etc. A complete description of the different elements that can be defined for the wrapping path in the job ticket file is described in detail in the Appendix, below.

Figure 3:
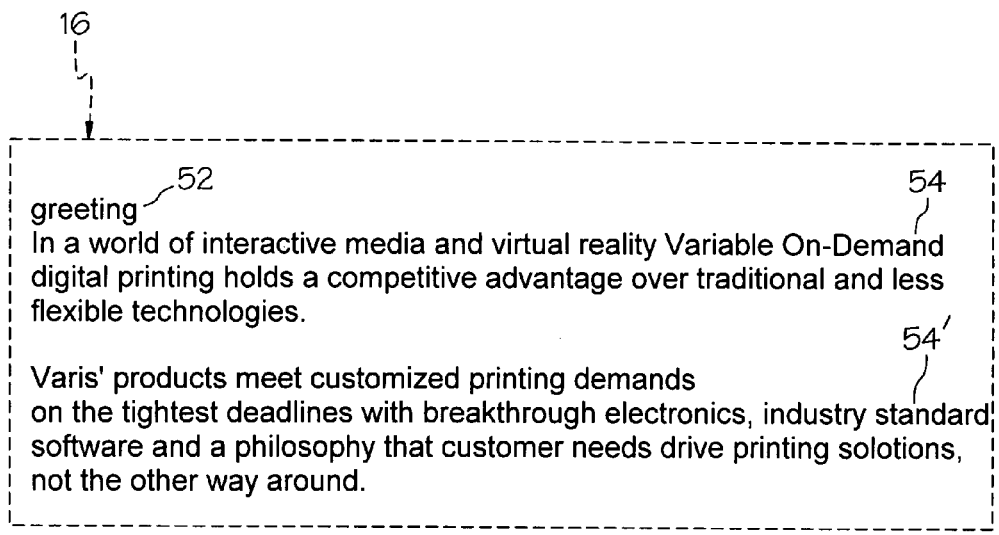
FIG. 3 is a second example of a merge file for use with the present invention.

As illustrated in FIG. 3, the merge file 16 is a platform-independent data file that contains the "variable" data to be merged into the path defined in the PDL specification. The merge file can contain a field name 52, corresponding to a field name that will be defined in the PDL specification, which is associated with a particular variable data path. The merge file will also contain a number of variable data blocks 54, text blocks in this case, corresponding to the field name 52. One variable data block 54 will be merged into the variable data path, defined in the PDL specification, at a time.

Figure 4:
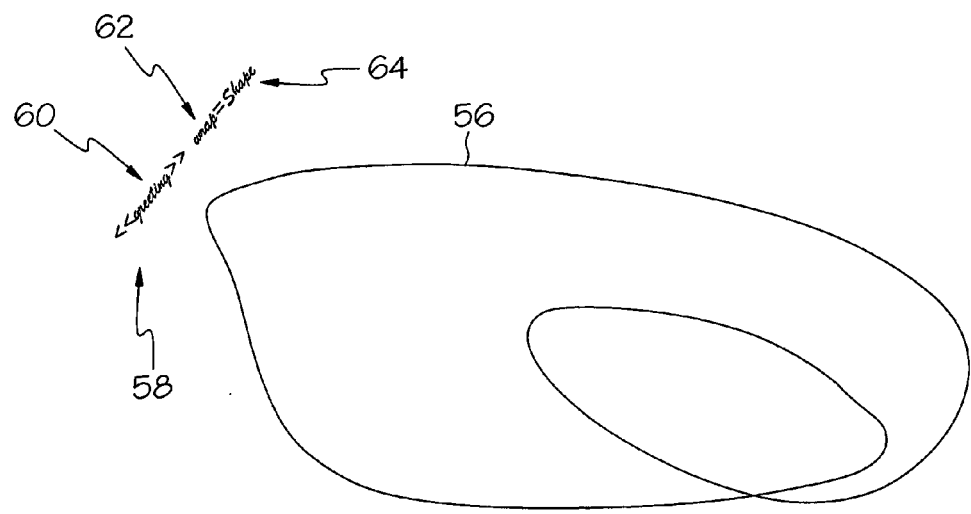
FIG. 4 is a graphical representation of data contained in a first example PDL specification for use with the present invention.

As illustrated in FIG. 4, the designer will utilize an application program to create a document containing a path 56 and attribute data, such as an attribute string 58, to be associated with the path 56. The application program will then be directed to create a PDL specification of the document by the designer. The attribute string 58 contains a field name 60 surrounded by special characters, "<<" and ">>", a wrap attribute command string 62, and a path identifier 64. The PDL specification generated by the application program will include the graphic states of the attribute string 58. These graphic states can include the font size (i.e., 10 point), the type-font (i.e., Script) the orientation (i.e., angled upwardly at 50°) and the like.

As discussed above, and referring again to FIGS. 1–4, the control task 22 will execute a PDL interpreter program to interpret the PDL specification created by the application program to generate a template bitmap 25 of the document, and to also monitor for any variable data paths defined in the PDL specification.

In the preferred embodiment, the control task 22 monitors for variable data areas defined by the PDL specification by monitoring for special characters in the text strings defined by text commands in the PDL specification. As shown in FIG. 4, the special characters "<<" and ">>" surround the field name 60. The control task, upon identifying the special characters in the text command for the attribute string will thus know that the attribute string 58 is defining a variable data area, and is not merely defining a text string to appear on the printed page (the attribute string will not appear on the final printed page unless the control task is directed to by the job ticket file). The field name 60 surrounded by the special characters identifies the associated field name 52 present in the merge file 16. During the processing of the text command for the attribute string 58, the control task will also monitor for the wrap string 62 within the attribute string, which also includes the path identifier string 64 associated therewith. If found, the control task will know that a path defined in the PDL specification that has a predetermined relationship with the text command for the attribute string will be a wrapping path, where the wrapping path has the wrapping attributes defined in the job ticket file 12 for the particular group header 44 and descriptive name of a path 42 matching the path identifier string 64 set forth in the attribute string 58.

Preferably, the predetermined relationship is satisfied by the first path command to follow the text command for the attribute string in the PDL specification. This can be accomplished by using the application program to sequentially type the attribute string 58 and then draw the path 56, such that the path command will be the first path command to follow the text command in the PDL specification created by the application program. Alternatively the predetermined relationship can be satisfied by the path command that is "grouped" with the text command for the attribute string in the PDL specification. This can be accomplished by using a "GROUP" tool as provided by many application programs to group the attribute string 58 and path 56 together. It will be apparent to one of ordinary skill in the art that there are many similar predetermined relationships available between the text command for the attribute string and the path command for the wrapping path that can be established in the PDL specification, all of which fall within the scope of the present invention.

Thus, during the execution of the PDL interpreter program, the control task 22 will match the wrap attribute command string 62 and path identifier 64 with the group header 44 and descriptive name of the path 42 defined in the job ticket file 12. Once the attribute string 58 is identified as defining a variable data path by the control task 22, the control task will save the graphic states 23 of the attribute string 58 in memory. The control task may also create a font cache according to the graphic states 23, and store the font cache along with the graphic states in memory 24. The control task will also save the field name 60 along with the graphic states 23 in memory so that the particular graphic states can be matched to the blocks of text data in the merge file 16 under the matching field name 52, as will be described below. The merge task 28 will apply these graphic states 23 and associated font cache to the variable data 54 prior to merging and flowing the variable data into the path 56.

Once the control task 22 has identified the path as being a variable data path, and has reserved the graphic states 23 of the attribute string 58 associated with the path in memory 24, the control task 22 advances to the next data area in the PDL specification, preferably without allowing the attribute string data or the path to be added to the template display list 25 stored in memory 26. And once the PDL interpreter program has completed interpreting the PDL specification, the control task 22 then passes authority to the merge task 28.

The merge task 28 first accesses a set of the saved graphic states 23 and identifies the field name 60 associated with these graphic states. The merge task 28 then accesses the merge file 16 and searches the merge file for a field name 52 matching the field name 60 associated with the graphic states. The merge task then accesses a variable data block 54 associated with the field name 52 and then generates rendering commands for the variable data block according to the graphic states 23, the predefined flow rule 48 and the boundary of the path 56. The predefined flow rule 48 may or may not be defined by the job ticket file 12. Accordingly, when the rendering command is executed the bit map data defined by the rendering command will flow within the path 56 according to a predefined flow rule.

Figure 5:
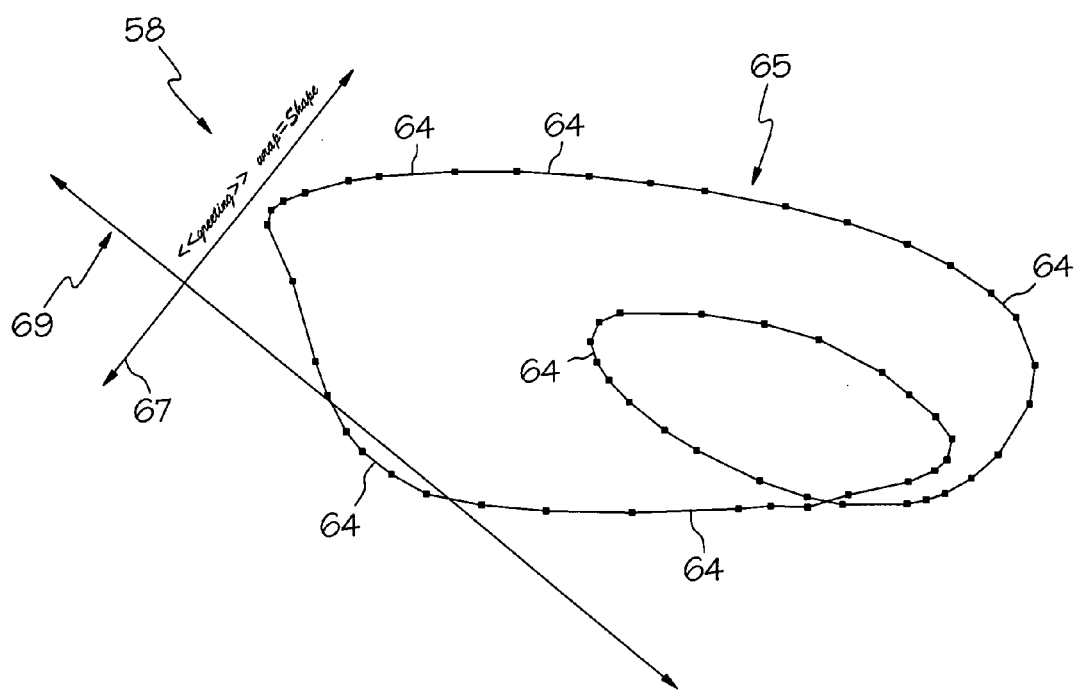
FIG. 5 is a graphical representation of a process step of the present invention operating on data contained in the PDL specification of FIG. 4.
Figure 6:
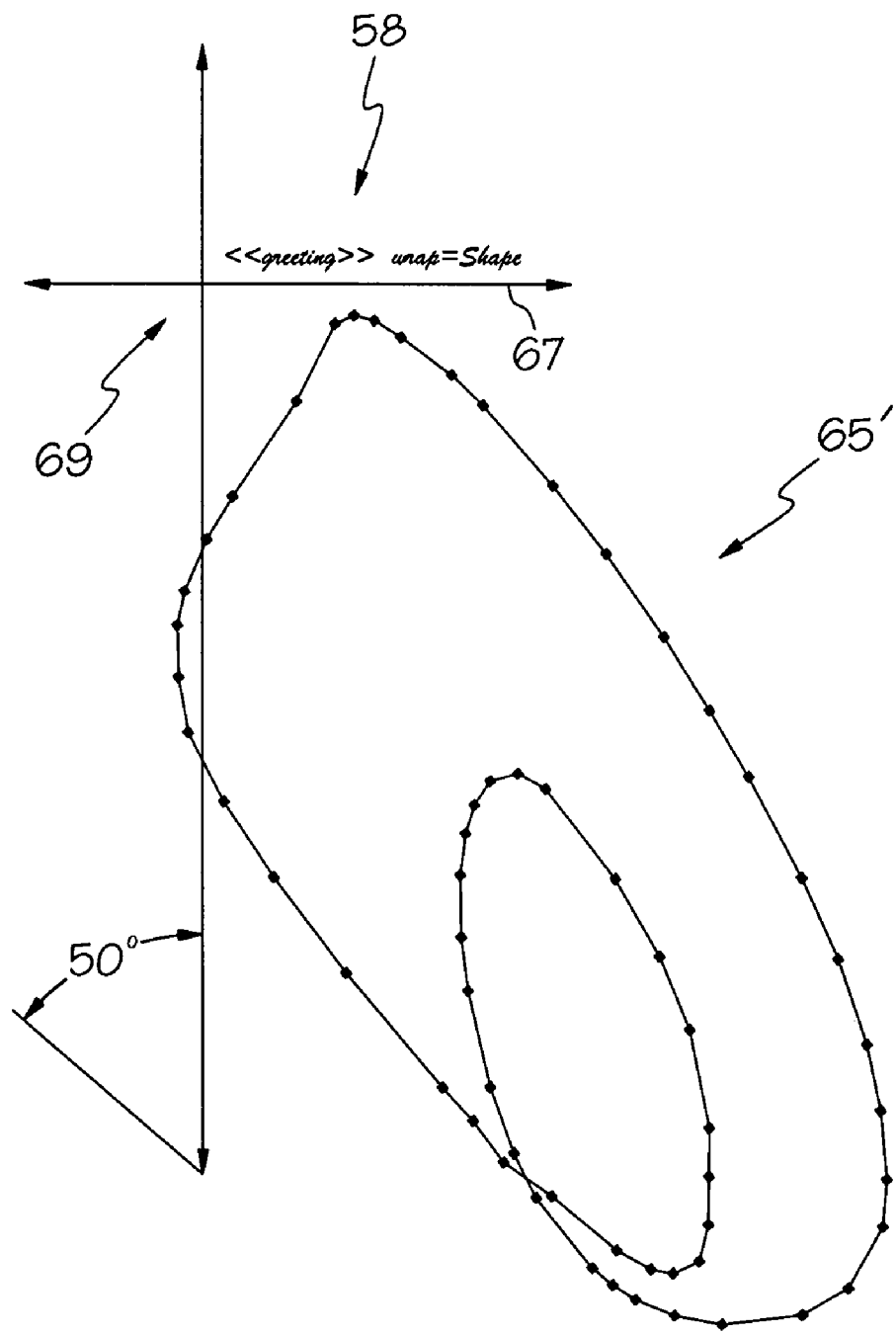
FIG. 6 is a graphical representation of a process step of the present invention following the process step of FIG. 5.
Figure 9:
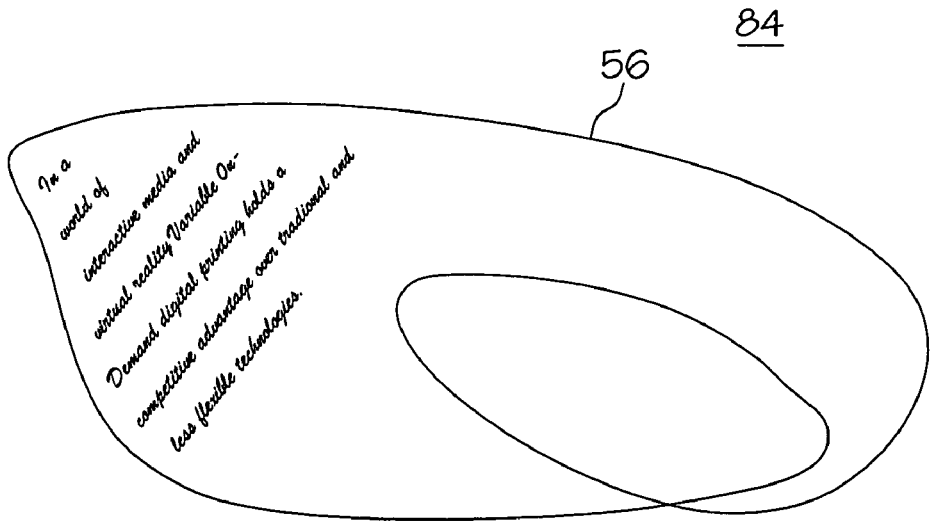
FIG. 9 is an example of a merged document created by the process and system of the present invention.
Figure 10:
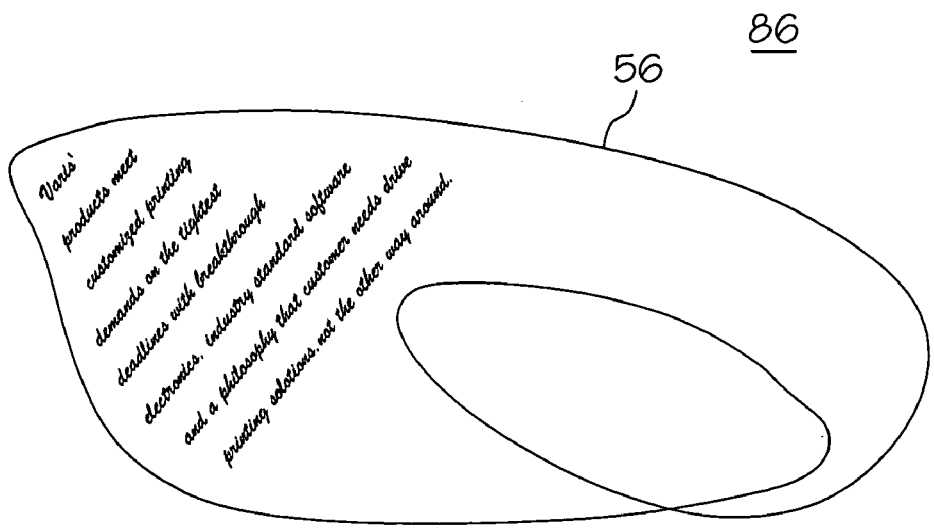
FIG. 10 is an example of a merged document created by the process and system of the present invention.
Figure 11:
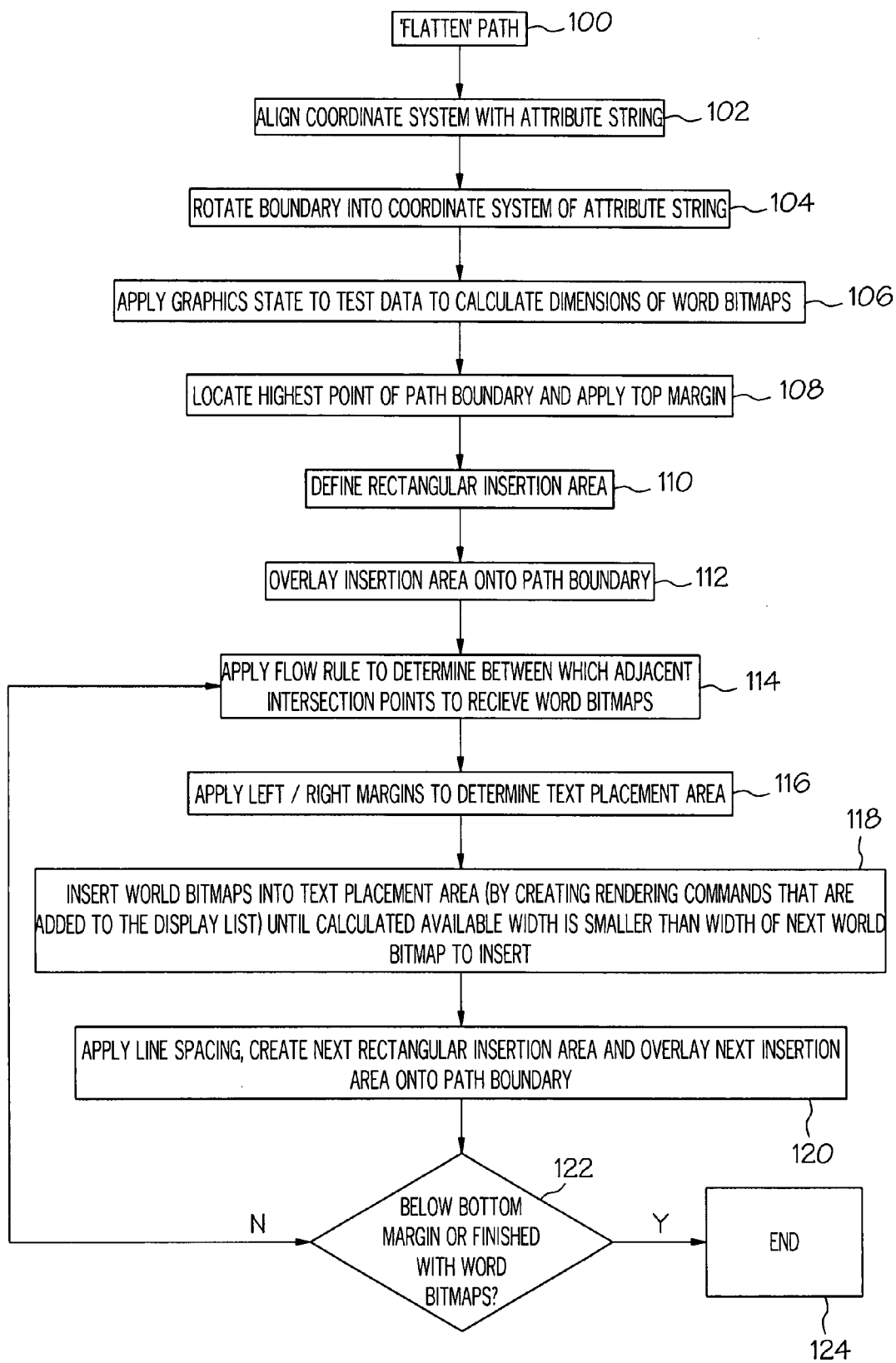
FIG. 11 is a flow chart representation of a process of the present invention.

As shown in FIG. 11, and as illustrated in FIGS. 5–10, a method for merging and flowing the variable text data into the path 56 is as follows: as indicated in step 100 and illustrated in FIG. 5, preferably the control task will first "flatten" the path, which involves breaking the complex path 56 (which may contain ellipses and curves) into a series of simple straight lines 64 (i.e., converting the path into a series of "move to" and "line to" commands). Each straight line 64 will comprise a particular portion of a boundary 65, into which the variable data is to be positioned. Alternatively, it is within the scope of the present invention to have the path 56 itself define the boundary into which the variable data is to be positioned. As will be described below, the extent of the boundary may also be defined, in part, by the designation of margins, or the creation of additional paths, etc. As indicated in step 102 and as also illustrated in FIG. 5, a horizontal axis 67 of a coordinate system 69 will be aligned with the attribute string 58. As indicated in step 104 and as illustrated in FIG. 6, a new equivalent boundary 65' is created, whose coordinates are those of the original boundary 65, but rotated into the same coordinate system 69 as the attribute string 58 (for example, as shown in FIG. 5, the attribute string 58 is rotated a negative 50° in the document, and therefore, in FIG. 6 the boundary 65' is rotated by a positive 50°).

Figure 7:
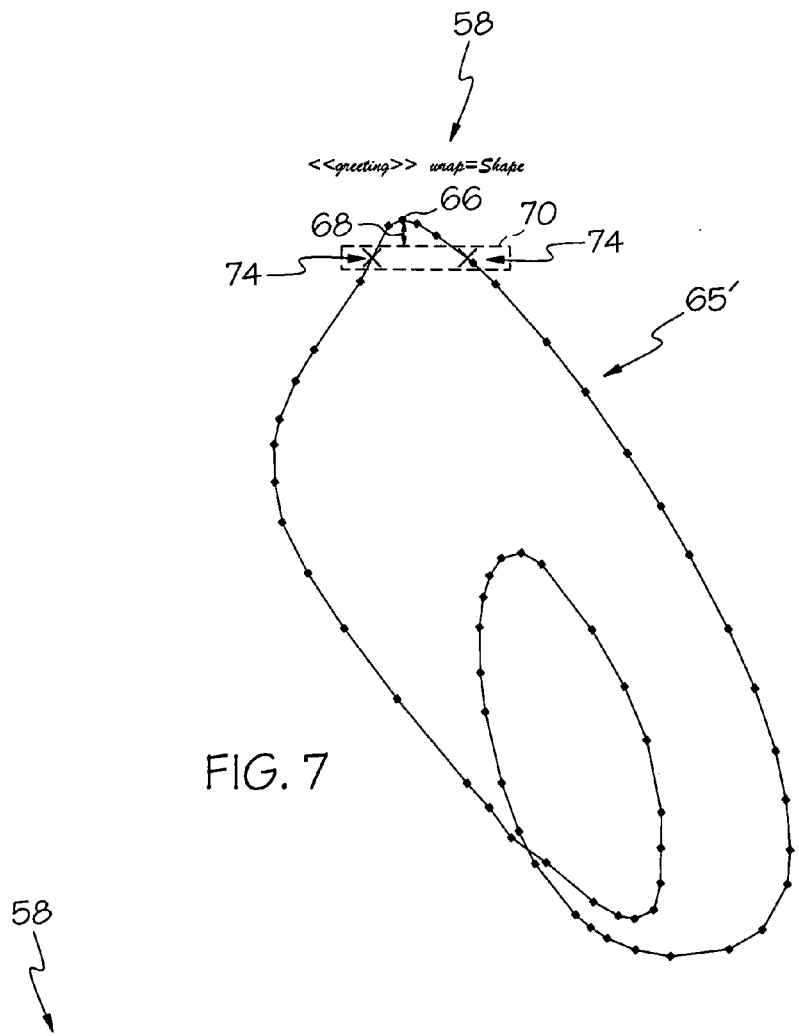
FIG. 7 is a graphical representation of a process step of the present invention following the process steps of FIGS. 5 and 6.
Figure 8:
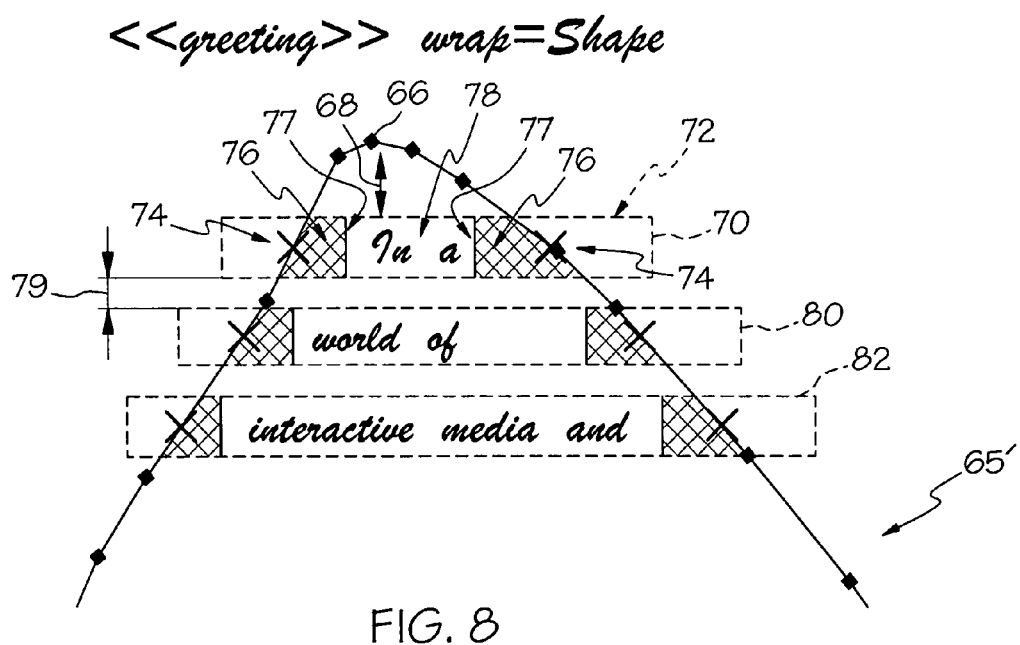
FIG. 8 is a graphical representation of a process step of the present invention following the process steps of FIGS. 5 and 6.

As indicated in step 106, the stored graphic states 23 (e.g., font-type and point size) are applied to a variable data block 54 to be merged into the boundary 65' and to calculate the dimensions of a plurality of word bitmaps, the word bitmaps being defined by a collection of characters separated from the rest of the data by white space characters (e.g., a space, tab, new line, etc.). The dimensions of paragraphs can be calculated by defining a paragraph as a collection of word bitmaps separated from other paragraphs by "new line" characters. Assuming that the text flow direction will be from top to bottom and left to right, as indicated in step 108 and as illustrated in FIGS. 7 and 8, the "top" or highest point 66 of the path 65' is determined and a top margin 68 is applied to the boundary 65' by measuring a distance downward from the highest point 66 of the boundary. The top margin 68 can be pre-defined, defined in the job ticket file 12, or by any other sufficient means.

As indicated in step 110 and illustrated in FIGS. 7 and 8, a rectangular insertion area 70 is defined, having a vertical height corresponding to the calculated vertical height of the bitmap representation of the first word (the point size of the text) to be flowed into the boundary 65', and having a top horizontal border 72 abutting the top margin 68. As indicated in step 112, this insertion area 70 will be overlayed onto the entire boundary 65' at that present vertical level to establish at least one intersection point 74. As indicated in step 114, only those areas between adjacent intersection points 74 will be considered valid candidates for receiving the bitmap representations of the text data. If there are more than two intersection points present within the insertion area, then the particular flow rule being utilized will determine between which of the intersection points that the bitmap representations of the text data will be inserted. As illustrated in FIGS. 7 and 8, when only two intersection points are established, the bitmap representations of the text data will typically be inserted therebetween.

Once two adjacent intersection points 74 are determined to be candidates for receiving bitmap representations of the text data, as indicated in step 116 and illustrated in FIG. 8, left and right margins will then be measured inwardly from each of the intersection points 74 to define left and right borders 77 within the rectangular insertion area 70. Between the left and right borders 77, therefore, is defined a text placement area 78 for merging the bitmap representations of the text data therein. The left and right margins 76 can be pre-defined, defined in the job ticket file 12, or determined by any other sufficient means.

As indicated in step 118, the rendering commands to create the bitmap representations of a word of the text data as merged into the text placement area are created and added to the display list 25, depending upon whether the calculated width of the bitmap is equal to or less than the available width calculated to remain in the text placement area. The rendering commands will define the proper orientation of the bitmap representation of the word rotated back into the original orientation of the attribute string.

As illustrated in FIG. 8, in the first text placement area 78, bitmap representations of the words "in" and "a" were able to fit therewithin, however, the bitmap representation of the word "world" was too wide for the remaining width. Accordingly, in the final merged bitmap only the bitmaps representing the words "in" and "a" will be rendered into the first text placement area 78. If no word bitmaps are capable of fitting within the text placement area, then the area is left blank.

As indicated in step 120 and illustrated in FIG. 8, a line-spacing 79 is measured below the present insertion area and then the next rectangular insertion area 80 is created and overlayed onto the boundary 65' below the line-spacing 79 in the same manner as defined above for the first rectangular insertion area 70. As indicated in step 122, if the new insertion area extends below the lowest point of the boundary 65' (or below the bottom margin) or if there are no more words to insert, then the merging process for this particular boundary and text block is finished as shown in step 124. If the insertion area does not extend below the lowest point of the boundary and there are more bitmaps representing words to insert, then the process returns to step 114, described above. Essentially, steps 114–122 will be repeated thereafter until step 124 is reached. As illustrated in FIG. 8, bitmaps representing the words "world" and "of" were able to be rendered into the second rectangular insertion area 80 and bitmaps representing the words "interactive," "media" and "and" were able to rendered into third rectangular insertion area 82.

Subsequent to step 122, the merge task will then search for additional variable data areas or variable data paths in which to merge variable data blocks. If no more of such variable data areas or variable data paths exist for the particular document, then the merged display list 30 is transferred to the rendering task 32, as described above, to generate the bitmap bands 34 for printing. FIG. 9 illustrates the entire block of text 54 from the merge file 16 formatted according to the above process and merged into the path 56 to create a first finished document 84. FIG. 10 illustrates the appearance of the next block of text 54' from the merge file 16 formatted according to the above process and merged into the path 56 to create a second finished document 86.

Preferably, in the above step 118, the height of the rectangular insertion area is determined by the dimensions calculated for the first word bitmap. And if, for whatever reason, a next word bitmap is calculated to be higher than the first or previous word bitmap, and higher than all other word bitmaps inserted thus far into a particular text placement area, then the entire rectangular insertion area is thrown out, and steps 116 and 118 are repeated again for the higher rectangular insertion area generated according to this higher word bitmap.

As discussed above, a number fill rules are available for flowing the word bitmaps into the boundary. Accordingly, the merge task can mark the path intersections 74 as "positive," "negative" or "neutral" based upon whether the path enters and leaves from the top or the bottom of the insertion area, or whether it enters and exits the insertion area from the same direction. All of the available fill rules will be apparent to one of ordinary skill in the art, and are thus within the scope of the present invention.

As discussed above, text flowing into the boundary 65' will continue until it is determined that there are no more word bitmaps to flow into the boundary or until it is determined that there is no more text areas available to flow the word bitmaps into. In the case of the latter, it is within the scope of the invention to define a path as an "overflow" path for continuing the flowing of the text therein, until this overflow path runs out of room. This overflowing process can continue until once again it is determined that there are no more text areas to flow text into. Text can also flowed into more than one path at a time.

Figure 12:
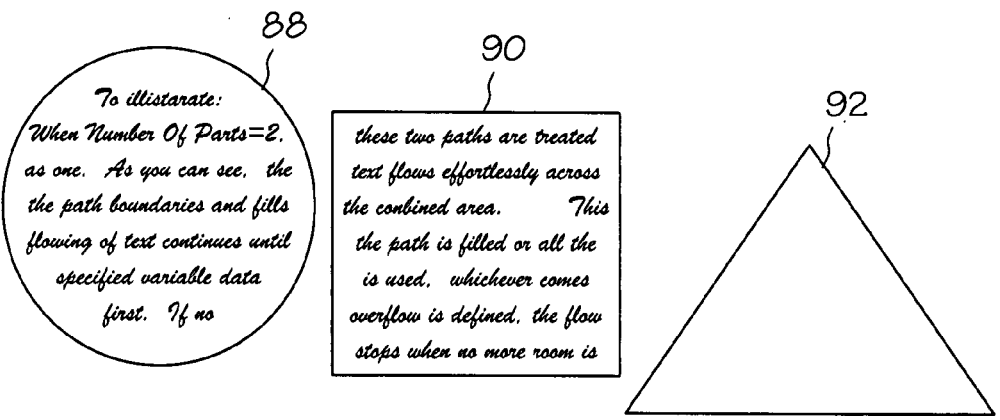
FIG. 12 is an example of a merged document created by the process and system of the present invention.
Figure 13:
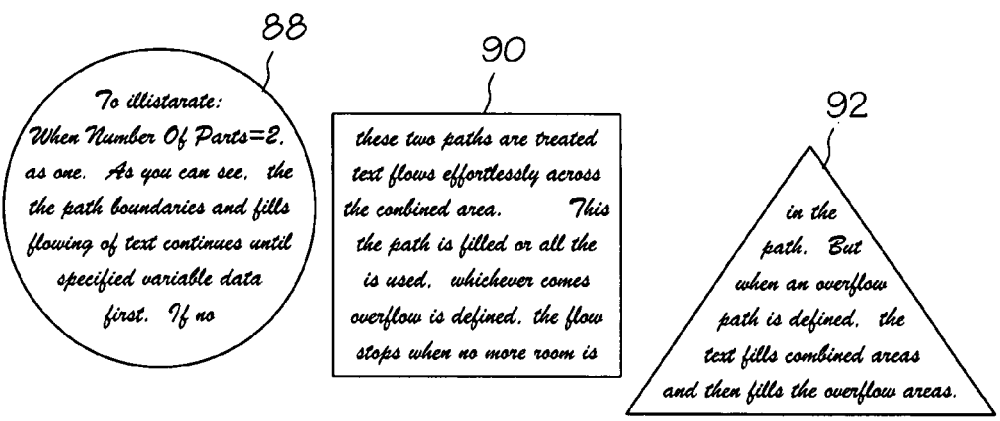
FIG. 13 is an example of a merged document created by the process and system of the present invention.

For illustration, as shown in FIG. 12, if the job ticket file defines the number of flow paths as two, and the two flow paths are the circle and square paths, designated as numerals 88 and 90, respectively; then the two paths essentially comprise one boundary, and text will flow directly from the circle path 88 into the square path 90. Note that the 2nd through 8th lines of text flow from the circle path 88 directly into the square path 90. But when the text reaches the end of the square path 90, the flowing operation stops because the area within the two flow paths has been used up. Accordingly, as illustrated in FIG. 13, if an "overflow path" is designated in the job ticket file to be the triangle path 92, the text flowing will continue into the triangle path 92 until there is no more text to be merged or until the path runs out of additional room.

The operation of the present invention is illustrated by way of a second example as shown in FIGS. 14–18. This second example illustrates the use of the present invention in constructing a book having variable text and picture placement, where a character name presented in the book may also be customized. Once customized, the text and pictures will flow into the pages of the book regardless of the size differences between the substituted character names. For example, if a substituted character name is substantially longer or shorter than the original character name in the text, the text and pictures will flow throughout the book such that no noticeable gaps or overflows are detectable. In order to perform such a task, the present invention allows a plurality of different merge files or data items to be flowed into a single path; the present invention allows text to flow around pictures that are inserted into the path; and by utilizing special delimiters within the merge file, the merged task is able to recognize points in the merge data where the graphic states to be applied to such merge data are to be changed in accordance with a next attribute string in the PDL Specification. This is all explained in detail as follows:

As illustrated in FIG. 14, the job ticket file 12 contains a group header, "[PageDescriptionLanguageFile]" 126 specifying the file path(s) defined thereunder as determining the locations of the 'template' PDL files. In the present example, the template PDL file path 128 defines the location of the template (PostScript) file "jungle.ps" as shown graphically in FIG. 16. Next, the job ticket file 12 lists a group header, "[MergeFiles]" 144 specifying the labels ("names" and "rikkitxt") of the merge files to be accessed by the merge task. The group header "[names]" 146 is thereafter defined in the job ticket file to provide information about the merge file "names.txt" located in the file path 130. As indicated by the definitions following the group header "[names]" 146, this merge file is a delimited merge file where the record delimiters are '/n' and the field delimiters are '|'. In this merge file, the definition DoGlobalSubstitution is set to FALSE, which indicates that substitutions of the text within the merge file are not to be performed by the merge task during the merging operation. The group header "[rikkitxt]" 148 provides information about the merge file "rikki.txt" located in the file path 132. The MergeType definition is set to "field", which indicates that the merge file only contains a single record; and therefore requires no record delineations. The MergeHeader definition is set as NO, which indicates that the merge file will not include a merge header (because there is only one record in the merge file). As also defined under the "[rikkitxt]" group header is that the field delimiter will be '#' character, the page break delimiter will be the '~' character and the paragraph delimiter will be the '@' character. Finally, the definition DoGlobalSubstitution is set to TRUE which means the merge task is to look for text phrases within the rikki.txt merge file and replace them with variable data as defined in the job ticket file as follows.

The group header 150 "[mergefile:substitution]" establishes the global substitutions for the "rikki.txt" merge file as described above. Accordingly, within the body of the "rikki.txt" merge file, every instance of the name Mowgli is to be changed to the variable data name listed under the "name1" heading (which is present in the "names" merge file—not shown). Furthermore, any occurrence of the name Teddy within the "rikki.txt" merge file will be replaced with the same variable data name as listed under the "name1" heading in the "names" merge file. This substitution is preferably performed by the merge text when creating bitmaps for the merge data in the "rikki.txt" merge file that are to be merged into the template defined in the "jungle.ps" file (FIG. 16).

The next group header 136 "[Wrap]" in the job ticket file 12 contains a descriptive name of a path 134 (in this case, named "path") for identifying a name of a path in the PDL file that is to have variable data flowed into it during the merge task. The group header 136 "[Wrap]" indicates that the group is defining a wrapping path. After the wrapping path "path" has been defined in the job ticket file, a next group header 138 "[path]" is thereafter defined to provide information about the wrap path, such as defining the FillRule 140 as using the even/odd rule, defining the DrawPath definition as FALSE 142 to indicate that the path is not to be drawn. The other definable wrapping commands for the particular path "path" are described in detail in the appendix below.

Although not shown in FIG. 14, the job ticket file 12 includes attribute definitions defining the print job as a 'book' job, which directs the merge task to repeatedly access templates and flow bitmaps into the path(s) in the templates until the merge task reaches the end of the merge file.

Figure 16:
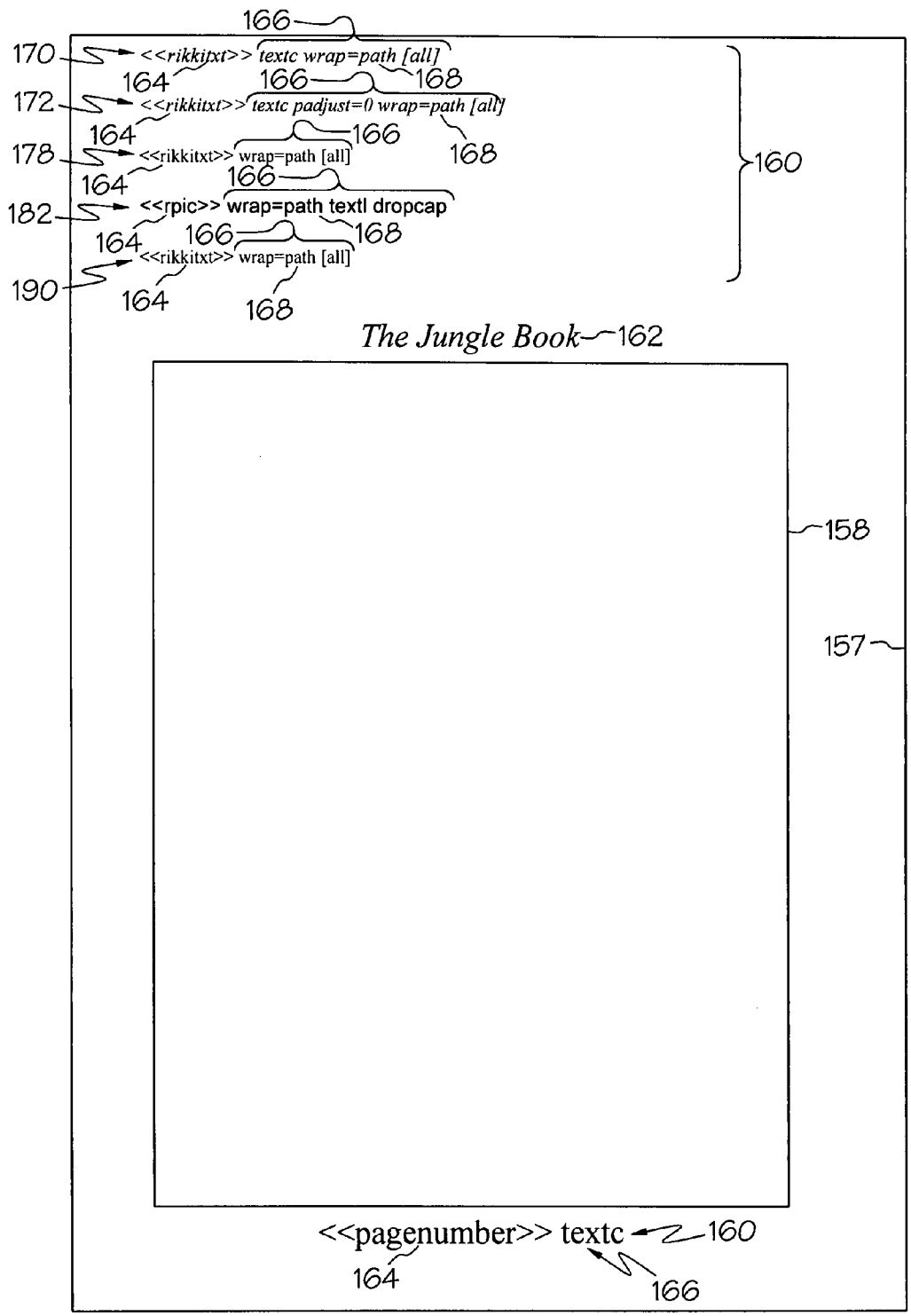
FIG. 16 is a graphical representation of data contained in a second example PDL specification for use with the present invention.

As illustrated in FIGS. 15A and 15B, the merge file "rikki.txt" 16 is a platform independent data file that contains the 'variable' data to be merged into the path defined in the PDL specification (FIG. 16). In the present example, this merge file does not contain a field name because the MergeHeader definition in the job ticket file 12 was set to NO. In the present example, the mergefile is a single data record consisting of the text of the Rikki-Tikki-Tavi story of the Jungle Book. Paragraph delimiters 154 ('@') are placed at selected points within the text to inform the merge task where to start a new paragraph during the merging operation. Field delimiters 156 ('#') are also placed in selected areas of the text to indicate to the merge task when a particular field of the merge file has ended and a next field of the merge file is to begin. The use of the field delimiters 156 will be described in greater detail below.

As illustrated in FIG. 16, the designer will utilize an application program to create a template document 157 containing a path 158 and several attribute data strings 160. As discussed above, the designer will associate the attribute data strings 160 with the path 158 by assuring that the path 158 is the first path drawn after the insertion of the attribute data strings 160 or by using a "GROUP" feature of the application program to group the attribute data strings 160 with the path 158. As also shown in FIG. 16, the template document 157 also contains static data 162 which will remain constant during every printing of the merged document. Once the template document 157 has been created, the application program will then be directed to create at PDL specification 14 of the document. Each attribute string 160 contains a field name 164 surrounded by special characters, a wrap attribute command string 166, and a path identifier 168 if the attribute data is to be associated with a path. The PDL specification generated by the application program will include the graphic states of the attribute strings. For example, the graphic states for first attribute string 170 include a bold/italics font attribute and a larger point size attribute; the graphic states for second attribute string 172 include an italics font attribute and a smaller point size attribute than the first attribute string; the graphic states for third attribute string 178 include a standard font attribute, etc.

As discussed above, referring to FIG. 1 and FIGS. 14–17, the control task 22 will execute a PDL interpreter program to interpret the PDL specification created by the application program to generate a template bit map 25 of the template document 157, and to also monitor for any variable data paths defined in the PDL specification 14. During the execution of the PDL interpreter program, the control task 22 will match the path identifier 168 in each wrap attribute command string 166 with the group header 136 and descriptive name of the path 134 defined in the job ticket file 12. Once the attribute string 166 is identified as defining a variable data path by the control task 22, the control task will save the graphic states 23 of the attribute string 166 in memory (which is preferably a stack). The control task may also create a font cache according to the graphic states 23, and store the font cache along with the graphic states to memory 24. The control task will also link the graphic states 23 with the merge file defined by the job ticket file having a name matching the field name 164 ("rikitxt" for the first, second, third and fifth attributes strings 170, 172, 178, 182 and 190). The merge task 28 will apply these saved graphic states 23 and the associated font cache to the variable data prior to merging and flowing the variable data into the path 158.

Once the control task 22 has identified the path as being a variable data path, and it has reserved the graphic states 23 of the attribute strings 166 associated with the path in memory 24, the control task 22 advances to the next data area in the PDL specification, preferably without allowing the attribute strings or the path to be added to the template display list 25 stored in memory 26. Once the PDL interpreter program has completed interpreting the PDL specification, the control task 22 then passes authority to the merge task 28.

The merge task 28 first accesses a first set of graphic states 23 from memory 24 and identifies the particular field name 164 associated with these graphic states. The merge task 28 then accesses the merge file 16 associated with this field name and graphic states. The merge task then accesses a variable data block associated with a first variable data block in the merge file and then generates rendering commands for the variable data block according to the graphic states 23, the predefined flow rule 140 and the boundary of the path 158.

Figure 17C:
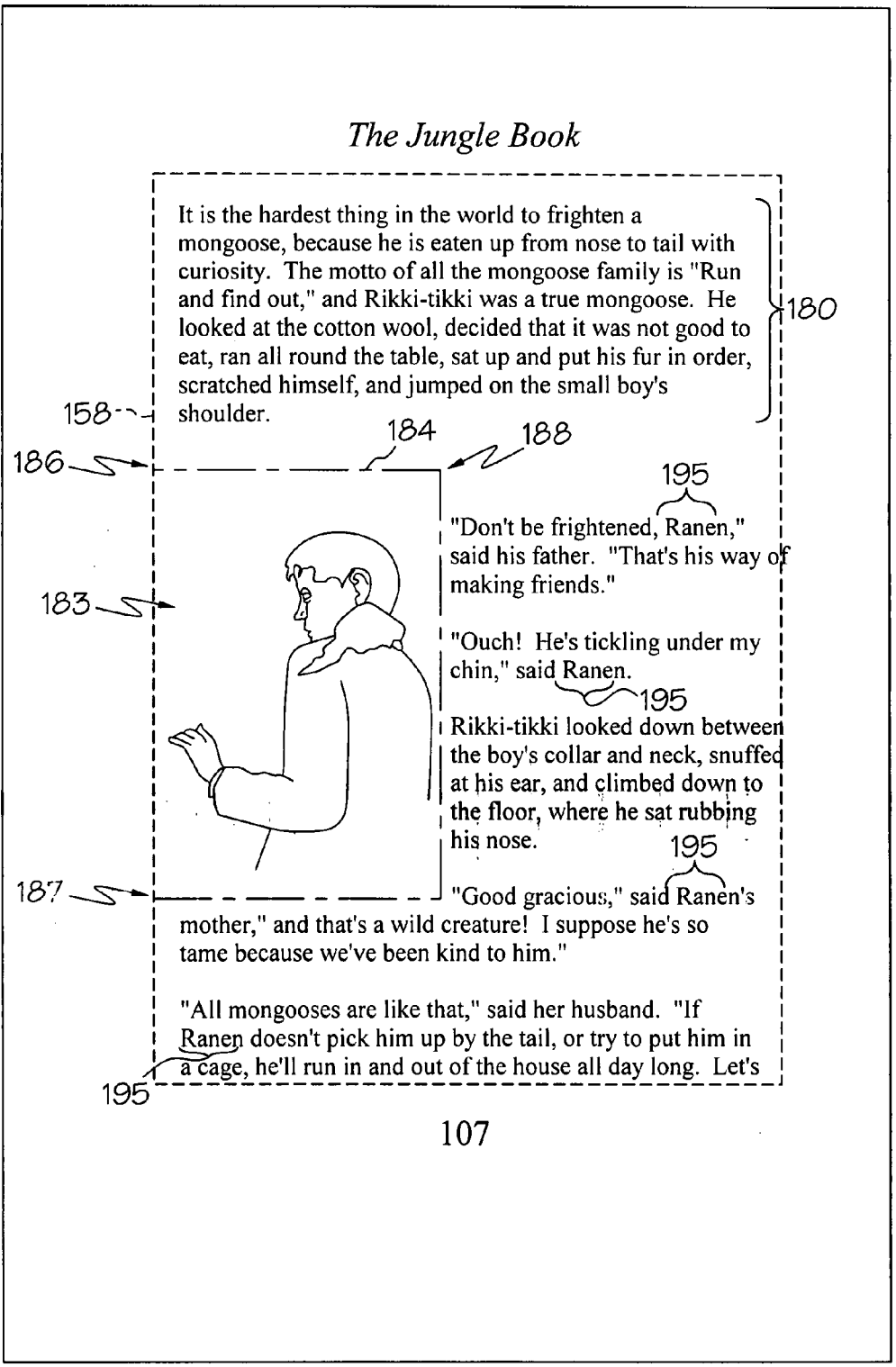

As illustrated in FIGS. 17A–17C, a method for merging and flowing the text data in the merge file into the path 158 of the document 157 to create the variable length book is as follows. Upon initiation, the merge task will first access the saved graphic states and attributes associated with the first attribute string 170 defined in the PDL specification. As shown in FIG. 16, the field name is "rikkitxt" and the path associated with the attribute string 170 is the path 158 (because the path 158 is the first path created after the attribute string 170). Referring to FIG. 14, the merge task matches the field name "rikkitxt" 164 in the first attribute string 170 with the group header 148, and accesses the merge file identified by the path 132. As shown in FIG. 15A, a first text-block 171 is taken from the beginning of the mergefile until a first field delimiter 156*a* is encountered. The saved graphic states 23 associated with the first attribute string 170 are applied to this text block to create a bit map for the text block which is then flowed into the path 158 as shown by numeral 172 in FIG. 17A. Note that the attribute string 170 included an attribute command "textc," which caused the control task to add an additional text centering attribute to the saved graphic states 23. Accordingly, the bit map 172 associated with the text string and applied graphic states is centered in the path 158. The paragraph delimiter 154 in the mergefile causes the merge task to add a line space after the insertion of the bit map 172.

Because the merge task reaches the first field delimiter 156*a* in the mergefile, the merge task refers back to memory to retrieve the reserved graphic states 23 attributed to the second attribute string 172. The field name 164 identified by the second attribute string 172 is "rikkitxt" as in the first attribute string 170; and therefore, the merge task will again refer to the mergefile 152 when retrieving variable data to insert into the path. It is should be apparent to those of ordinary skill in the art that the field name 164 may also refer to a different merge file and the merge task would thus access data from the different merge file. As with the first attribute string 170, the second attribute string 172 includes the additional attribute commands such as "textc" and "padjust=0." Referring again to FIG. 15A, the merge task will access the next block of data 173 between the first field delimiter 156*a* and the second field delimiter 156*b*. The merge task will then apply the graphic states 23 corresponding to the second attribute string 172 to this text data to form the bit map data block 174 to be merged into the path 158. Once this bit map block has been merged into the document, the merge task accesses the graphic states associated with the next attribute string 178 from memory.

Because the field name 164 in the third attribute string 178 is "rikkitxt" as with the first two attribute strings, the merge task will refer back to the mergefile 152 and will extract the block of data 179 after the second field delimiter 156*b* and before the third field delimiter 156*c*. The graphic states 23 associated with the third attribute string 178 will be applied to this text data to create bit map data which is merged and flowed into the path 158 according to the steps described herein. Once the merge text reaches the end of the path 158, the merge task will know to access another copy of the template from memory because a "book" attributes have been predefined in the job ticket file. The second template bit map is indicated in FIG. 17B. Note that the block of text flows beyond the path 158 of the second template bitmap shown in FIG. 17B and into the path 158 of the third template bitmap shown in FIG. 17C. Once this block 180 has been mapped and the merge task reaches the third field delimiter 156*c*, the merged task refers back to the graphics states 23 in memory to obtain the graphic states associated with the fourth attribute string 182.

The field name 164 in this attribute string 182 refers to "rpic1", which is defined in the job ticket file as a bit map of a picture to be inserted at this point. Note that this attribute string also includes additional attribute commands:
"textl" and "dropcap". This indicates that the picture bit map is to have left justification and is to be treated as a drop-cap character. As shown in FIG. 17C, the picture bitmap is inserted into the path 158 with left justification after the block of bit map data 180. If the drop-cap command had not been specified in the attribute string, the next block of data would be inserted at point 185 after the picture bit map. However, it is often desirable to include pictures within the text of a book and then have text appear to flow around the picture. Accordingly, the drop-cap attribute definition indicates to the merged text to treat the bit map defined in the attribute string as a drop-cap character. When the merged task sees this command, after inserting the picture 183 into the path 158 the merged task adds the boundary 184 of the picture to the path 158 and then moves the insertion point of the next bit map data to the beginning 186 of the picture bit map 183. However, because the boundary 184 of the picture bit map 183 has been combined with the boundary 158 of the path, the next insertion point will be at point 188 to the right of the picture bit map.

Once this step is completed, the merge task will access the graphic states 23 associated with the next attribute string 190 from memory. The field name "rikkitxt" 164 in this next attribute string 190 indicates to the merge task to access data again from the merge file 152. Referring to FIG. 15C, the next point to access data for the merge file is the block of data indicated by numeral 192, between the third and fourth field delimiters 156*c*, 156*d*. The graphic states 23 of this next attribute string 190 will be applied to this block of data 192 and the bit maps will thus be flowed into the path 158 as discussed above. This block of data 192 is the first block including a character name 'Teddy' which the job ticket directs as needing to be replaced by a variable data name from the 'names.txt' merge file as discussed above. In the present example, the first variable name listed in the 'names.txt' merge file is "Ranen." Accordingly, merge file will replace all instances 193 within the block of data 192 where the name 'Teddy' appears with the 'Ranen' bitmaps 195 in the printed document. This process will continue until the merge task reaches the end of the mergefile 152, indicating to the merge task that the book has been created. FIGS. 18A–18C illustrate the appearance of the pages of the book as prepared in the example described above.

Accordingly, the present invention provides capability of identifying particular paths defined in a page description language as data flowing paths, and provides the capability for flowing data within such paths. In addition, the present invention allows the user to specify margin, paragraph formatting, fill rules, and justification parameters on a path by path basis.

Having described the invention in detail and by reference to the drawings, it will be apparent to one of ordinary skill in the art that variations and modifications are possible without departing from the scope of the invention as defined on the following claims.

The following appendix provides a preferred compilation of text wrapping commands and parameter definitions that can be specified in the job ticket file 12. Each entry provides the particular command header, the syntax for the command, any relevant remarks for the use of the command, examples, etc. As will be apparent to one of ordinary skill in the art, it is within the scope of the present invention to include the means to provide for any of the attributes, or similar attributes, as defined in the Appendix.

APPENDIX

COMMAND HEADER = [Wrap]
    A group that provides a list of tags which you create to describe the text flowing (wrap) path(s) to be used in the print job. Each tag will become a user-defined group of additional information about the wrap path.

Syntax      [Wrap]
                        <Path Tag X.>
                        <Path Tag Y>
                        <Path Tag Z>

Remarks    Optional. Each tag that appears under this [Wrap] group will optionally become a new group name in a succeeding section of the Job Ticket.

Explanation    <Path Tax X>
                      Create a descriptive name for a wrap path used in the print job.

Note:        Fields on a template that you wish to be flowed into a particular path will use a field attribute of the format:
                            <<fieldname>>    wrap=<name>
                The <name> argument of the wrap attribute must match a path tag listed in the [Wrap] group.

Example    [Wrap]
                      Circle
                      Square
                      Triangle COMMAND HEADER = [<Path Tag>]
    A user-defined tag name for a group that provides information about the wrap path and corresponds to the descriptive tag that you create under the initial [Wrap] group.

Syntax      [<Path Tag>]
                      Baseline Adjust =
                      Bottom Margin =
                      Clobber Path =
                      Draw Path =
                      Enforce paragraph Spacing =
                      Fill Rule =
                      Fit Last Name =
                      Justify =
                      Left Margin =
                      Margins =
                      MinParagraph Lines =
                      Number Of Paths =
                      Overflow =
                      Paragraph Adjust =
                      Reverse Flow =
                      Reverse Path =
                      Right Margin =
                      Top Margin =

Remarks    A separate [<Path>] group defines path information for each descriptive tag listed under the initial [Wrap] group.
                      If a [<Path Tag>] group is not defined for a path listed under the [Wrap] group, that path will receive the default values for all of the [<Path Tag>] elements.

Explanation    [<Path Tag>]
                      Take the descriptive tag under the initial [Wrap] group and write it here as a group name within the brackets [ ].
                      Baseline Adjust =
                            (See the Baseline Adjust element description)
                      Bottom Margin =
                            (See the Bottom Margin element description)
                      Clobber Path =
                            (See the Clobber Path element description)
                      Draw Path =
                            (See the Draw Path element description)
                      Enforce Paragraph Spacing =
                            (See the Enforce Paragraph Spacing element description)
                      Fill Rule =
                            (See the Fill Rule element description)
                      Fit Last Line =
                            (See the Fit Last Line element description)
                      Justify =
                            (See the Justify element description)
                      Left Margin =
                            (See the Left Margin element description)
                      Margins =
                            (See the Margins element description)
                      Min Paragraph Lines =
                            (See the MinParagraph Lines element description)
                      Number Of Paths =
                            (See the Number Of Paths element description)
                      Overflow =
                            (See the Overflow element description)

APPENDIX-continued

```
              Paragraph Adjust =
                      (See the Paragraph Adjust element description)
              Paragraph Indent =
                      (See the Paragraph Indent element description)
              Reverse Flow =
                      (See the Reverse Flow element description)
              Reverse Path =
                      (See the Reverse Path element description)
              Right Margin =
                      (See the Right Margin element description)
              Top Margin =
                      (See the Top Margin element description)
    Examples  [Circle]
                              Fill Rule =      EvenOddRule
                              DrawPath         = False
                              Overflow         = Square
              [Square]
                              FillRule =       WindingRule
                              DrawPath         = True
                              Overflow         = Triangle
              [Triangle]
                              FillRule =       EvenOddRule
                              DrawPath         = False
                              Overflow         = Square
              [Square]
                              FillRule =       WindingRule
                              DrawPath         = True
                              Overflow         = Triangle
              [Triangle]
                              FillRule =       EvenOddRule
                              DrawPath         = False
```

PARAMETER = Baseline Adjust
An element that determines the adjustments made to each baseline of text drawn within the path.
- Syntax    Baseline Adjust = <BaseAdjustNum><Unit Type>
- See Also  Paragraph Adjust, Enforce Paragraph Spacing.
- Remarks   Optional.
    By default, the process will space successive text lines at 120% of the font size. For example, a 12-point font will have the next baseline set at 14.4 points (120% × 12) from the previous baseline. The Baseline Adjust element defines an offset from this default value.
    A positive Baseline Adjust value increases the space between each baseline of text (essentially, moving the next line of text down). A negative value decreases the space between each baseline of text (essentially, moving the next line of text up).
    The default value for Baseline Adjust is 0.
- Explanation  <BaseAdjustNum>
    Enter the number of units.
    <Unit Type>
    Optional. Enter the abbreviation to identify the unit type if the unit type for Baseline Adjust is different from the default unit type defined in the Units element. Possible values are:
    - cm    for centimeters
    - dots  for dots
    - ft    for feet
    - in    for inch (default value)
    - mm    for millimeter
    - pts   for points
- Example   BaselineAdjust = 1pt PARAMETER = Bottom Margin
An element that specifies the distance from the bottom of the path at which to stop flowing text.
- Syntax    BottomMargin = <BottomMarginNum><Unit Type>
- See Also  Margins, Overflow.
- Remarks   Options.
- NOTE:     A non-zero value for the BottomMargin element overrides (for the bottom margin only) the value set in the Margins elements.
    For example, if Margins = 1in and BottomMargin = 2in, the path will have 1-inch margins on the top, left, and right sides but will have a 2-inch margin on the bottom side.

The default value for Bottom Margin is 0.
- Explanation  <BottomMarginNum>
    Enter the number of units.
    <UnitType>
    Optional. Enter the abbreviation to identify the unit type if the unit type for Bottom Margin is different from the default unit type defined in the Units element. Possible values are:
    - cm    for centimeters

APPENDIX-continued

```
                dots        for dots
                ft          for feet
                in          for inch (default value)
                mm          for millimeter
                pts         for points
    Example     BottomMargin = 3mm
PARAMETER = Clobber Path
    An element that specifies if two adjacent ON areas separated by a path segment
are treated as one area when determining text flow.
    Syntax      ClobberPath = [True/False]
    See Also    FillRule
    Remarks     Optional
                This element affects the way in which text is flowed in adjacent ON
                areas. It applies only to paths defined with FillRule = WindingRule.
                If ClobberPath is set to True, text is flowed across the two adjacent
                ON areas as if they were one area. In this case, only the "outer"
                margins of the combined areas would be recognized. Text flow
                would be continuous across the "inner" margins where the path
                segment intersects the adjacent areas.
                If ClobberPath is set to False, text is flowed separately into each
                area.
                The default value of ClobberPath is True.
    Explanation {True/False}
                If two adjacent ON areas are to be treated as one area, type True.
                If two adjacent ON areas are to be maintained separately, type
                False.
    Example     ClobberPath = False
PARAMETER = DrawPath
    An element that determines if the wrap path is actually drawn on the template.
    Syntax      DrawPath = {True/False}
    Remarks     Optional.
                The default value for DrawPath is True.
    Explanation {True/False}
                If the wrap path is to be drawn on the template, type True.
                If the wrap path is NOT to be drawn on the template, type False.
    Example     DrawPath = False
PARAMETER = EnforceParagraphSpacing
    An element that determines if the next paragraph will always start at a distance
of the ParagraphAdjust value from any previous paragraphs that were set.
    Syntax      EnforceParagraphSpacing = {True/False}
    See Also    BaselineAdjust, ParagraphAdjust.
    Remarks     Optional.
                If the text flowed into your path contains blank paragraphs, this
                element determines how the blank paragraphs are to be handled.
                If you want your next paragraph to start at a distance of the
                ParagraphAdjust value from your previous text paragraph (thereby,
                "skipping" any blank paragraphs and permitting text to continue to
                flow), set the EnforceParagraphSpacing value to True.
                If you want the blank paragraphs to be allotted the appropriate
                space defined in ParagraphAdjust, set the
                EnforceParagraphSpacing value to False.
                The default value for EnforceParagraphSpacing is False.
    Explanation {True/False}
                If the next non-blank paragraph should start at a distance of the
                ParagraphAdjust value from any previous paragraphs that were
                set, type True.
                If blank paragraphs are to be allocated their appropriate paragraph
                space, type False.
    Example     EnforceParagraphSpacing = True
PARAMETER = FillRule
    An element that provides the rules used to determine which areas of the path
should have text flowed into them and which areas should be blank.
    Syntax      FillRule = {WindingRule/EvenOddRule}
    See Also    ClobberPath, ReversePath.
    Remarks     Optional.
                Text is flowed into an area enclosed by ("inside") the current path.
                If a path is simple, it is clear which areas are inside the path.
                However, if a path is complex (for example, intersecting itself or
                having one subpath that encloses another), it is not as apparent
                which areas are inside. One of two fill rules will be used to
                determine which areas lie inside a path.
                The FillRule element defines if the non-zero winding rule
                (WindingRule) or the even-odd rule (EvenOddRule) will be used
                for the current path.
                The non-zero winding rule determines whether a given area along
                the proposed flow line is inside the path (and thus receives text) by
                examining the places where a path segment crosses the flow line.
                Path segments that cross (intersect) the flow line from top to
                bottom are given a direction of 1. Path segments that cross
```

APPENDIX-continued (intersect) the flow line from bottom to top are given a direction of −1. Path segments that do not fully cross the flow line (for example, entering and exiting the top of the flow line) are given a direction of zero.

An on-going sum of all crossings is calculated from left to right. If the sum of all crossings to that point is zero, the area (immediately to the right) is outside the path. If the sum is non-zero, the area is inside the path and will receive text.

The even-odd rule determines whether a given area long the proposed flow line is inside the path (and thus receives text) by counting the number of times a path segment crosses the flow line. Path segments that fully cross (intersect) the flow line are given a score of 1. Path segments that do not fully cross the flow line are given a score of zero.

An on-going sum of all crossings is calculated from left to right. If the sum of all crossings to that point is even, the area (immediately to the right) is outside the path. If the sum is odd, the area is inside the path and will receive text.

The default value for FillRule is WindingRule.

- Explanation {Winding Rule/EvenOdd Rule}
  If the winding rule will determine which areas lie inside a path, type WindingRule.
  If the even-odd rule will determine which areas lie inside a path, type EvenOddRule.
- Example FillRule = EvenOddRule PARAMETER = FitLastLine An element that determines if the Fit justification rule is applied to the last line of every paragraph.

- Syntax FitLastLine = {True/False}
- See Also Justify
- Remarks Optional.
  The FitLastLine element applies only to paths defined with Justify = Fit.
  If FitLastLine is set to True, the text on the last line will be forced to fit flush on the left and the right. Since the last line of a paragraph may often contain less text than the other lines in a paragraph, this justification will often result in more white space between text on the last line.
  The default value for FitLastLine is False.
- Explanation {True/False}
  If the last line of every paragraph should be aligned ab both the left side and the right side of the path, type True.
  If the last line of every paragraph should not be forced to fit flush left and flush right, type False.
- Example FitLastLine = False PARAMETER = Justify An element that specifies the type of justification (horizontal alignment) to be applied to each line of text drawn in the path.

- Syntax Justify = <JustifyRule>
- See Also FitLastLine
- Remarks Optional.
  The default value for Justify is Left.
- Explanation <JustifyRule>
  Enter the type of justification (horizontal alignment) to be applied to each line of text drawn in the path. Possible values are:
  Left     (Default value) Text is aligned from the left side of the path.
  Right    Text is aligned from the right side of the path.
  Center   Text is centered between the left side and right side of the path.
  Fit      Text is aligned at both the left side and right side of the path.
- Example Justify = Center PARAMETER = LeftMargin An element that specifies the distance from the left side of the path at which to start flowing text.

- Syntax LeftMargin = <LeftMarginNum><UnitType>
- See Also Margins
- Remarks Optional.
- NOTE: A non-zero value for the LeftMargin element overrides (for the left margin only) the value set in the Margins elements.
  For example, if Margins = 1in and LeftMargin = 2in, the path will have 1-inch margins on the bottom, top, and right sides but will have a 2-inch margin on the left side.
  A default value for LeftMargin is 0.
- Explanation <LeftMarginNum>
  Enter the number of units.
  <UnitType>
  Optional. Enter the abbreviation to identify the unit type if the unit APPENDIX-continued type for LeftMargin is different from the default unit type defined in
the Units element. Possible values are:
cm	for centimeters
dots	for dots
ft	for feet
in	for inch (default value)
mm	for millimeter
pts	for points Example	LeftMargin = 5 mm PARAMETER = Margins An element that specifies the same text margins for all four sides of the path
(top, bottom, left, and right).

Syntax	Margins = <MarginsNum><Unit Type>
See Also	BottomMargin, LeftMargin, Right Margin, TopMargin
Remarks	Optional.
Note:	The value for the Margins element will be overridden on an
individual margin basis by any non-zero value defined for the other
specific margin attributes (BottomMargin, LeftMargin, RightMargin,
and TopMargin).
For example, if Margins = 1in and TopMargin = 2in, the path will
have 1-inch margins on the bottom, left, and right sides but will
have a 2-inch margin on the top.
The default value for Margins is 0.
Explanation	<MarginsNum>
Enter the number of units.
<UnitType>
Optional. Enter the abbreviation to identify the unit type if the unit
type for Margins is different from the default unit type defined in the
Units element. Possible values are:
cm	for centimeters
dots	for dots
ft	for feet
in	for inch (default value)
mm	for millimeter
pts	for points Example	Margins = 6 mm PARAMETER = MinParagraphLines An element that specifies the minimum number of lines of a paragraph to be set
before the paragraph is allowed to be split between path areas.

Syntax	MinParagraphLines = <MinLinesNum>
See Also	NumberOfPaths, Overflow.
Remarks	Optional.
If the minimum number of lines of a paragraph defined here cannot
be set consecutively in a path area, the entire paragraph will be
moved down to the next scanline that allows the specified number
of lines to be set consecutively.
The default value for MinParagraphLines is 1.
Explanation	<MinLinesNum>
Enter the integer representing the minimum number of lines of a
paragraph to be set before splitting between path areas is
permitted.
Example	MinParagraphLines = 2

PARAMETER = NumberOfPaths

An element that determines how many postscript paths on the template are
concatenated and treated as one path.

Syntax	NumberOfPaths = <PathsNum>
See Also	MinParagraphLines, Overflow.
Remarks	Optional.
This element is used to combine multiple paths drawn on the
template and to treat them as a single path. The path to be
combined will be determined by the order in which they were
drawn.
The default value for NumberOfPaths is 1.
Explanation	<PathsNum>
Enter the integer representing the number of paths to be combined.
Example	NumberOfPaths = 2
Illustration	See FIG. 12 and corresponding description above PARAMETER = Overflow An element that specifies the name (tag) of the wrap path that will receive
overflow text from the current wrap path being described.

Syntax	Overflow = <PathTag>
See Also	MinParagraph Lines, NumberOfPaths.
Remarks	Optional.
This element defines the use of an overflow feature. When
overflow is available, if the current path has no more space into
which text can flow, the text will continue to flow into the path
named in this element.
NOTE:	If the Overflow element references a wrap path that is not named
under the [Wrap] group, the print job will be aborted.

APPENDIX-continued

|             |                                                                                                                                                                                                                                              |
|-------------|----------------------------------------------------------------------------------------------------------------------------------------------------------------------------------------------------------------------------------------------|
|             | If the Overflow element is not defined, the system will assume that no overflow will occur for the current path being described. Therefore, text will flow into the current path until it is filled. No overflow text will be printed. |
| Explanation | <PathTag><br>Enter the descriptive tag of the path into which overflow text from the current path will flow. This value should correspond to a descriptive tag that you created under the initial [Wrap] group. |
| Example     | Overflow = Square                                                                                                                                                                                                                            |
| Illustration| See FIG. 13 and the corresponding description above.                                                                                                                                                                                        |

PARAMETER = ParagraphAdjust

An element that determines the distance to adjust the baseline for the start of the next paragraph within the path.

|           |                                                                                                                                                                                                                                                                                                                                                                                                                                                                                                                                 |
|-----------|---------------------------------------------------------------------------------------------------------------------------------------------------------------------------------------------------------------------------------------------------------------------------------------------------------------------------------------------------------------------------------------------------------------------------------------------------------------------------------------------------------------------------------|
| Syntax    | ParagraphAdjust = <ParagraphadjustNum><Unit Type>                                                                                                                                                                                                                                                                                                                                                                                                                                                                  |
| See Also  | BaselineAdjust, Enforce Paragraph Spacing.                                                                                                                                                                                                                                                                                                                                                                                                                                                                                      |
| Remarks   | Optional.<br>The ParagraphAdjust value overrides the Baseline Adjust value only for the first baseline of text in each paragraph.<br>A position ParagraphAdjust value increases the vertical space between the last baseline of text in each paragraph and the start of the next paragraph (essentially, moving the start of the next paragraph down). A negative value decreases the vertical space between the last baseline of text in each paragraph and the start of the next paragraph (essentially, moving the start of the next paragraph up).<br>The default value for ParagraphAdjust is 0. |
| Explanation | <ParagraphadjustNum><br>Enter the number of units.<br><UnitType><br>Optional. Enter the abbreviation to identify the unit type if the unit type for ParagraphAdjust is different from the default unit type defined in the Units element. Possible values are:<br>    cm    for centimeters<br>    dots  for dots<br>    ft    for feet<br>    in    for inch (default value)<br>    mm  for millimeter<br>    pts  for points |
| Example   | ParagraphAdjust = 6pts                                                                                                                                                                                                                                                                                                                                                                                                                                                                                                          |

PARAMETER = ParagraphIndent

An element that specifies the indentation from the left margin for the first line of every paragraph in the path.

|             |                                                                                                                                                                                                                                                                                                                                                                                                                                                                                                                                           |
|-------------|-------------------------------------------------------------------------------------------------------------------------------------------------------------------------------------------------------------------------------------------------------------------------------------------------------------------------------------------------------------------------------------------------------------------------------------------------------------------------------------------------------------------------------------------|
| Syntax      | ParagraphIndent = <ParagraphIndentNum><UnitType>                                                                                                                                                                                                                                                                                                                                                                                                                                                                              |
| See Also    | ParagraphAdjust                                                                                                                                                                                                                                                                                                                                                                                                                                                                                                                           |
| Remarks     | Optional.<br>The default value for ParagraphIndent is 0.                                                                                                                                                                                                                                                                                                                                                                                                                                                                                  |
| Explanation | <ParagraphIndentNum><br>Enter the number of units.<br><UnitType><br>Optional. Enter the abbreviation to identify the unit type if the unit type for ParagraphIndent is different from the default unit type defined in the Units element. Possible values are:<br>    cm    for centimeters<br>    dots  for dots<br>    ft    for feet<br>    in    for inch (default value)<br>    mm  for millimeter<br>    pts  for points |
| Example     | ParagraphIndent = .5in                                                                                                                                                                                                                                                                                                                                                                                                                                                                                                                    |

PARAMETER = ReverseFlow

An element that determines if the text will be flowed from bottom to top in the current path.

|             |                                                                                                                                      |
|-------------|--------------------------------------------------------------------------------------------------------------------------------------|
| Syntax      | ReverseFlow {True/False}                                                                                                             |
| See Also    | FillRule                                                                                                                             |
| Remarks     | Optional.<br>The default value for ReverseFlow is False.                                                                            |
| Explanation | {True/False}<br>If the text will be flowed from bottom to top, type True.<br>If the text will be flowed from top to bottom, type False. |
| Example     | ReverseFlow = True                                                                                                                   |

PARAMETER = ReversePath

An element that determines if the ON/OFF designations for areas in the path will be reversed.

|          |                                                                                                                                                                                  |
|----------|----------------------------------------------------------------------------------------------------------------------------------------------------------------------------------|
| Syntax   | ReversePath = {True/False}                                                                                                                                                       |
| See Also | FillRule                                                                                                                                                                         |
| Remarks  | Optional.<br>The ReversePath element applies only to paths defined with FillRule = EvenOddRule.<br>If ReversePath is set for True, the areas originally marked as ON |

APPENDIX-continued

|  |  |
|---|---|
|  | based on the EvenOddRule calculation will be set to OFF and the areas originally marked as OFF based on the EvenOddRule calculation will be set to ON. |
|  | If ReversePath is set to False, the EvenOddRule calculations will be retained. |
|  | The default value for ReversePath is False. |
| Explanation | {True/False} |
|  | If the ON/OFF designations for areas in the path will be reversed, type True. |
|  | If the ON/OFF designations for areas in the path will be retained, type False. |
| Example | ReversePath = True |

PARAMETER = RightMargin
An element that specifies the distance from the side of the path at which to stop flowing test.

|  |  |  |
|---|---|---|
| Syntax | RightMargin = <RightMarginNum><UnitType> | |
| See Also | Margins | |
| Remarks | Optional. | |
|  | NOTE: | A non-zero value for the RightMargin element overrides (for the right margin only) the value set in the Margins element. |
|  | For example, if Margins = 1in and RightMargin = 2in, the path will have 1-inch margins on the bottom, top, and left sides but will have a 2-inch margin on the right side. | |
|  | The default value for RightMargin is 0. | |
| Explanation | <RightMarginNum> | |
|  | Enter the number of units. | |
|  | <UnitType> | |
|  | Optional. Enter the abbreviation to identify the unit type if the unit type for RightMargin is different from the default unit type defined in the Units element. Possible values are: | |
|  | cm | for centimeters |
|  | dots | for dots |
|  | ft | for feet |
|  | in | for inch (default value) |
|  | mm | for millimeter |
|  | pts | for points |
| Example | RightMargin = 5mm | |

PARAMETER = TopMargin
An element that specifies the distance from the top of the path at which to start flowing text.

|  |  |
|---|---|
| Syntax | TopMargin = <TopMarginNum><UnitType> |
| See Also | Margins |
| Remarks | Optional. |
| NOTE: | A non-zero value for the TopMargin element overrides (for the top margin only) the value set in the Margins element. |
|  | For example, if Margins = 1in and TopMargin = 2in, the path will have 1-inch margins on the bottom, left, and right sides but will have a 2-inch margin on the top side. |
|  | The default value for TopMargin is 0. |
| Explanation | <TopMarginNum> |
|  | Enter the number of units. |
|  | <UnitType> |
|  | Optional. Enter the abbreviation to identify the unit type if the unit type for TopMargin is different from the default unit type defined in the Units element. Possible values are: |
|  | cm    for centimeters |
|  | dots    for dots |
|  | ft    for feet |
|  | in    for inch (default value) |
|  | mm    for millimeter |
|  | pts    for points |
| Example | TopMargin = .25in |

What is claimed is:

1. A computer-implemented method of associating a particular path defined in a page description language specification with a plurality of special attributes, comprising the steps of:

monitoring a first text string defined by a first page description language text command in the specification for a first special character or a first special string of characters, the first special character or the first special string of characters being indicative of a first special attribute;

monitoring a second text string defined by a second page description language text command in the specification for a second special character or a second special string of characters, the second special character or the second special string of characters being indicative of a second special attribute;

responsive to a detection of the first special character or the first special string of characters in the first text string, identifying a path defined by a page description language path command and having a predetermined relationship with the first text command in the specification as the particular path associated with the first special attribute; and responsive to a detection of the second special character or the second special string of characters in the second text string, identifying the path defined by the page description language path command and having a predetermined relationship with the second text command in the specification as the particular path associated with the second special attribute.

2. The method of claim 1, wherein the predetermined relationship is satisfied by the path command being the first path command to follow the first and second text commands in the specification.

3. The method of claim 1, wherein the predetermined relationship is satisfied by the path command being grouped with the first and second text commands in the specification.

4. The method of claim 1, wherein the first special attribute is associated with a first merge file and wherein the second special attribute is associated with a second merge file.

5. A computer-implemented method for wrapping data to an arbitrary path defined by a page description language, comprising the steps of:

(a) designating a path defined in a page description language specification as a wrapping path, the wrapping path having a wrapping-path boundary;

(b) processing the specification to produce a template bitmap, the template bitmap being a bitmap or raster-data representation of a template image defined by the specification;

(c) associating a block of text with the wrapping path;

(d) associating an external bitmap with the wrapping path;

(e) merging the external bitmap into the template bitmap, the external bitmap having an external-bitmap boundary;

(f) adding the external-bitmap boundary to the wrapping-path boundary, forming a composite boundary; and (g) merging bitmap representations of the text from the block of text, according to the composite boundary and according to predefined flow rule, into the template bitmap to create a merged bitmap.

6. The method of claim 5 whether the merging step (e) includes the step of merging the external bitmap into the template bitmap according to the wrapping-path boundary and according to the predefined flow rule.

7. A computer-implemented method for wrapping data to an arbitrary path defined by a page description language, comprising the steps of:

designating a path defined in a page description language specification as a wrapping path, the wrapping path having a boundary;

defining a first graphics state for the path;

defining a second graphics state for the path;

processing the specification to produce a template bitmap, the template bitmap being a bitmap or raster-data representation of a template image defined by the specification;

associating a text file with the wrapping path, the text file including a first block of text separated from a second block of text by a field delimiter, creating first bitmap representations of the first block of text by applying the first graphics state to the first block of text merging the first bitmap representations of the text, according to the boundary and according to a predefined flow rule, into the template;

creating second bitmap representation of the second block of text by applying the second graphics state to the second block of text; and merging the second bitmap representation of the text, according to the boundary and according to the predefined flow rule, into the template bitmap.

8. A computer-implemented method for wrapping data to an arbitrary path defined by a page description language, comprising the steps of:

designating a path defined in a page description language specification as a wrapping path, the wrapping path having a boundary;

defining a graphics state for the path;

processing the specification to produce a template bitmap, the template bitmap being a bitmap or raster-data representation of a template image defined by the specification;

associating a text block with the wrapping path, the text block including a plurality of words;

replacing all occurrences of a predetermined word in the text block with a substitute word;

creating bitmap representations of the text block by applying the graphics state to the text block; and merging the bitmap representations of the text block, according to the boundary and according to a predefined flow rule, into the template.

9. A computer-implemented method for wrapping data to an arbitrary path defined by a page description language, comprising the steps of:

designating a path defined in a page description language specification as a wrapping path, the wrapping path having a boundary;

defining a graphics state for the path;

processing the specification to produce a template bitmap, the template bitmap being a bitmap or raster-data representation of a template image defined by the specification;

associating a text block with the wrapping path, the text block including a plurality of words and a delimiter;

creating bitmap representations of the text block by applying the graphics state to the text block; and merging the bitmap representations of the text block, according to the boundary, according to predefined flow rule and according to the delimiter, into the template.

10. The method of claim 9, wherein the delimiter is a paragraph delimiter and the merging step includes the step of merging a bitmap representation of an indent or a line-space in place of the paragraph delimiter.

11. The method of claim 9, wherein the delimiter is an end-of-page delimiter and the merging step includes the step of ceasing the merging of the bitmap representations of the text block into the template.

12. A computer-implemented method for wrapping data to an arbitrary path defined by a page description language, comprising the steps of:

(a) designating a path defined in a page description language specification as a wrapping path, the wrapping-path having a wrapping-path boundary;

(b) defining a graphics state for the path;

(c) processing the specification to produce a template bitmap, the template bitmap being a bitmap or raster-data representation of a template image defined by the specification;
(d) saving the template bitmap in memory;
(e) associating a block of text with the wrapping path;
(f) creating bitmap representations of the block of text by applying the graphics state to the block of text;
(g) retrieving a first copy of the template bitmap from memory;
(h) merging the bitmap representations of the block of text, according to the boundary and according to the predefined flow rule, into the first copy of the template until an end of the boundary is reached;
(i) upon reaching the end of the boundary, retrieving a next copy of the template bitmap from memory; and
j) merging a remainder of the bitmap representations of the block of text, according to the boundary and according to the predefined flow rule, into the next copy of the template.

13. The method of claim 1, including the further step of using the particular path and the plurality of special attributes in a rendering command.

* * * * *